United States Patent
Huang et al.

(10) Patent No.: US 10,582,543 B2
(45) Date of Patent: Mar. 3, 2020

(54) RANDOM ACCESS METHOD, TERMINAL, AND NETWORK DEVICE

(71) Applicant: HUAWEI TECHNOLOGIES CO., LTD., Shenzhen, Guangdong (CN)

(72) Inventors: Huang Huang, Shenzhen (CN); Mao Yan, Chengdu (CN); Kuandong Gao, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/268,309

(22) Filed: Feb. 5, 2019

(65) Prior Publication Data

US 2019/0174550 A1 Jun. 6, 2019

Related U.S. Application Data

(63) Continuation of application No. PCT/CN2018/116254, filed on Nov. 19, 2018.

(30) Foreign Application Priority Data

Nov. 17, 2017 (CN) .......................... 2017 1 1149117

(51) Int. Cl.
*H04W 74/08* (2009.01)
*H04L 5/00* (2006.01)
(Continued)

(52) U.S. Cl.
CPC ....... *H04W 74/0833* (2013.01); *H04L 5/0007* (2013.01); *H04L 5/0048* (2013.01);
(Continued)

(58) Field of Classification Search
CPC ... H04W 56/00; H04W 56/001; H04W 72/12; H04W 74/00; H04W 74/08;
(Continued)

(56) References Cited

U.S. PATENT DOCUMENTS 8,553,675 B2 * 10/2013 Yamada ............ H04W 56/0005
370/350
9,491,781 B2 * 11/2016 Han .................. H04W 74/0866
(Continued)

FOREIGN PATENT DOCUMENTS

CN 101299873 A 11/2008
CN 101772181 A 7/2010
(Continued)

OTHER PUBLICATIONS

3GPP TS 36.211 V14A.0 (Sep. 2017), 3rd Generation Partnership Project; Technical Specification Group Radio Access Network;Evolved Universal Terrestrial Radio Access (E-UTRA); Physical channels and modulation(Release 14), 198 pages.
(Continued)

*Primary Examiner* — Tri H Phan
(74) *Attorney, Agent, or Firm* — Huawei Technologies Co., Ltd.

(57) ABSTRACT

This application provides a random access method, a terminal, and a network device. The random access method includes: determining, by a terminal, whether a resource used for random access conflicts with a resource used for receiving a downlink signal; and if the resource used for the random access conflicts with the resource used for the downlink signal, preferentially using the conflicting random access resource for receiving the downlink signal but not for the random access. This avoids a conflict between receiving of the downlink signal and sending of an uplink random access preamble.

16 Claims, 31 Drawing Sheets

(51) Int. Cl.
*H04W 56/00* (2009.01)
*H04W 72/12* (2009.01)

(52) U.S. Cl.
CPC ......... *H04L 5/0053* (2013.01); *H04W 56/001* (2013.01); *H04W 72/12* (2013.01)

(58) Field of Classification Search
CPC ............. H04W 74/0833; H04W 72/04; H04W 72/0446; H04L 5/00; H04L 5/0007; H04L 5/0048; H04L 5/0053; H04J 11/00
See application file for complete search history.

(56) References Cited

U.S. PATENT DOCUMENTS

| | | | |
|---|---|---|---|
| 9,521,693 B2 * | 12/2016 | Li | H04W 74/006 |
| 9,750,053 B2 * | 8/2017 | Pelletier | H04W 74/002 |
| 9,900,084 B2 * | 2/2018 | Ahn | H04B 7/2656 |
| 10,425,974 B2 * | 9/2019 | Axnas | H04W 72/0453 |
| 2013/0077519 A1 | 3/2013 | Van Lieshout et al. | |
| 2014/0376425 A1 * | 12/2014 | Han | H04W 74/0866 370/280 |
| 2016/0173263 A1 | 6/2016 | Kishiyama | |
| 2018/0324864 A1 * | 11/2018 | Jung | H04W 24/10 |
| 2019/0045426 A1 * | 2/2019 | Yan | H04L 5/0048 |
| 2019/0089498 A1 * | 3/2019 | Pelletier | H04L 5/003 |
| 2019/0104544 A1 * | 4/2019 | Axnas | H04W 74/085 |

FOREIGN PATENT DOCUMENTS

| | | |
|---|---|---|
| CN | 103392368 A | 11/2013 |
| CN | 107295662 A | 10/2017 |
| CN | 109152029 A | 1/2019 |
| WO | 2017197125 A1 | 11/2017 |

OTHER PUBLICATIONS

Motorola Mobility, Lenovo, Remaining details on random access procedure. 3GPP TSG RAN WG1 #90bis Prague, Czech Republic, Oct. 9-13, 2017, R1-1718696, 4 pages.
3GPP TS 38.211 V1.0.0 (Sep. 2017), 3rd Generation Partnership Project; Technical Specification Group Radio Access Network; NR; Physical channels and modulation(Release 15), 37 pages.
"3GPP TS 38.213 V1.0.0 (Sep. 2017), 3rd Generation Partnership Project; Technical Specification Group Radio Access Network; NR; Physical layer procedures for control(Release 15), 16 pages".
"3GPP TS 38.214 V1.0.0 (Sep. 2017), 3rd Generation Partnership Project; Technical Specification Group Radio Access Network; NR; Physical layer procedures for data (Release 15), 32 pages".
3GPP TS 38.331 V0.1.0 (Oct. 2017), 3rd Generation Partnership Project; Technical Specification Group Radio Access Network; NR; Radio Resource Control (RRC); Protocol specification(Release 15 ), 42 pages.
ZTE et al, WF on RACH association. 3GPP TSG RAN WG1 Meeting #88 Athens, Greece, Feb. 13-17, 2017, R1-1703630, 7 pages.
Huawei et al, WF on RACH association. 3GPP TSG RAN WG1 Meeting #88bis Spokane, USA, Apr. 3-7, 2017, R1-1706782, 3 pages.
Intel Corporation,"Remaining details of random access for NB-IoT",3GPP TSG RAN WG1 Meeting #84bis R1-162981, Busan, South Korea, Apr. 11-15, 2016, total 4 pages.

* cited by examiner

RANDOM ACCESS METHOD, TERMINAL, AND NETWORK DEVICE

CROSS-REFERENCE TO RELATED APPLICATIONS

This Application is a continuation of International Application No. PCT/CN2018/116254, filed on Nov. 19, 2018, which claims priority of Chinese Patent Application No. 201711149117.6, filed on Nov. 17, 2017, The disclosures of the aforementioned applications are hereby incorporated by reference in their entireties.

TECHNICAL FIELD

This application relates to the wireless communications field, and in particular, to a random access method, a terminal, and a network device.

BACKGROUND

In a new radio (NR) technology, a base station sends a downlink signal by using a plurality of beams. The downlink signal may be a downlink synchronization signal block (SS/PBCH block), a system information block, remaining minimum system information, a system information block 1 NR SIB1, a system information block 0 NR SIB0, a semi-statically configured downlink subframe and/or slot and/or OFDM symbol, a reserved downlink signal, a downlink demodulation reference signal (DMRS), or a downlink channel state information-reference signal (CSI-RS). Specifically, the base station covers a cell by using the plurality of beams. During communication between the base station and a terminal, an appropriate beam direction is required for performing communication. The base station requires the appropriate beam direction for receiving a random access preamble sent by the terminal, sending a random access response to the terminal, and the like. The downlink signal is sent in a time division manner. To be specific, different downlink signals are sent in different time periods, and random access preambles sent by the terminal are also received in different time periods. In addition, in the NR technology, a maximum quantity of downlink signals in one downlink signal set may vary depending on different frequency bands. For example, below 3 gigahertz (GHz), the maximum quantity of downlink signals in one downlink signal set is 4; at 3-6 GHz, the maximum quantity of downlink signals in one downlink signal set is 8; above 6 GHz, the maximum quantity of downlink signals in one downlink signal set is 64. All downlink signals in a downlink signal set are mapped to different slots and orthogonal frequency division multiplexing (OFDM) symbols within a 5-millisecond (ms) window.

Specifically, a downlink signal set is sent periodically, and a quantity of actually sent downlink signals in a downlink signal set may not be a maximum quantity. For example, below 6 GHz, eight bits are used to indicate whether eight downlink signals are actually sent; above 6 GHz, whether downlink signals are actually sent is indicated in an 8+8 manner: 64 downlink signals are divided into eight groups, each group includes eight downlink signals, eight bits are used to indicate whether the downlink signals in each group are sent, and another eight bits are used to indicate whether eight downlink signal sets are sent.

However, a period for sending a downlink signal set in the NR technology is relatively short. A minimum period may be 5 ms. In other words, downlink signals may be sent in nearly all slots in one system frame. Correspondingly, a random access preamble sent by the terminal is configured in an uplink time, and therefore a time in which the base station sends a downlink signal may conflict with a time in which the terminal sends an uplink random access preamble. The foregoing discussion is a discussion regarding ongoing design efforts for the NR and is not an admission of being prior art.

SUMMARY

This application provides a random access method, a terminal, and a network device, to resolve a problem that a time in which a base station sends a downlink signal may conflict with a time in which a terminal sends an uplink random access preamble.

According to a first aspect, this application provides a random access method, including:

determining, by a terminal, an actually available random access resources based on time location information for a random access resource and time location information for a downlink signal actually sent by a network device, where a time location for the actually available random access resource does not overlap with the time location for the actually sent downlink signal;

determining, by the terminal based on the actually available random access resource and an association relationship between a downlink signal and a random access resource, a target random access resource corresponding to the actually sent downlink signal; and sending, by the terminal, a random access preamble to the network device by using the target random access resource.

According to a second aspect, this application provides a random access method, including:

when determining that a time location for an actually transmitted downlink signal overlaps with a time location for a random access resource, determining, by a terminal, to puncture the random access resource whose time location overlaps with the time location for the actually sent downlink signal; or determining to puncture the random access resource whose time location overlaps with the time location for the actually sent downlink signal, and all random access resources that precede the random access resource whose time location overlaps with the time location for the actually sent downlink signal and that are in a slot in which the random access resource whose time location overlaps with the time location for the actually sent downlink signal is located; or determining to puncture all random access resources in a slot in which the random access resource whose time location overlaps with the time location for the actually sent downlink signal is located.

In a possible embodiment, the determining, by a terminal, an actually available random access resource based on time location information for a random access resource and time location information for a downlink signal actually sent by a network device includes:

determining, by the terminal based on the time location information for the random access resource and the time location information for the downlink signal actually sent by the network device, the random access resource whose time location overlaps with the time location for the actually sent downlink signal; and using, by the terminal as the actually available random access resource, a random access resource whose time location does not overlap with the time location for the actually sent downlink signal.

In a possible embodiment, after the determining, by the terminal, the random access resource whose time location overlaps with the time location for the actually sent downlink signal, the method further includes:

puncturing, by the terminal, the random access resource whose time location overlaps with the time location for the actually sent downlink signal; or puncturing, by the terminal, the random access resource whose time location overlaps with the time location for the actually sent downlink signal, and all the random access resources that precede the random access resource whose time location overlaps with the time location for the actually sent downlink signal and that are in the slot in which the random access resource whose time location overlaps with the time location for the actually sent downlink signal is located; or puncturing, by the terminal, all the random access resources in the slot in which the random access resource whose time location overlaps with the time location for the actually sent downlink signal is located.

In a possible embodiment, the downlink signal is one or more of the following: a downlink synchronization signal block, a system information block, remaining minimum system information, a new radio system information block 1 NR SIB1, a new radio system information block 0 NR SIB0, a semi-statically configured downlink subframe, a semi-statically configured slot, a semi-statically configured OFDM symbol, or a reserved downlink signal.

In a possible embodiment, the method further includes:

receiving, by the terminal, configuration information sent by the network device, where the configuration information indicates one or more of the following: the slot in which the random access resource is located is based on a subcarrier spacing of a random access message 1, the slot in which the random access resource is located is based on a subcarrier spacing of a random access message 3, the slot in which the random access resource is located is based on a subcarrier spacing of uplink initial access bandwidth, the slot in which the random access resource is located is based on a subcarrier spacing of a downlink signal, or a length of the slot in which the random access resource is located.

In a possible embodiment, the time location for the downlink signal is determined based on one or more of the following: a slot occupied by the downlink signal, an OFDM symbol occupied by the downlink signal, or a downlink/uplink guard period, where the slot is based on a subcarrier spacing of the downlink signal.

In a possible embodiment, the method further includes:

determining, by the terminal based on the time location information for the random access resource and time location information for a semi-persistent scheduling signal, a semi-persistent scheduling signal whose time location overlaps with the time location for the random access resource; and puncturing, by the terminal, the semi-persistent scheduling signal whose time location overlaps with the time location for the random access resource.

In a possible embodiment, the method further includes:

determining, by the terminal based on the time location information for the random access resource and time location information for a semi-persistent scheduling signal, a random access resource whose time location overlaps with the time location for the semi-persistent scheduling signal; and puncturing, by the terminal, the random access resource whose time location overlaps with the time location for the semi-persistent scheduling signal; or puncturing, by the terminal, the random access resource whose time location overlaps with the time location for the semi-persistent scheduling signal, and all random access resources that precede the random access resource whose time location overlaps with the time location for the semi-persistent scheduling signal and that are in a slot in which the random access resource whose time location overlaps with the time location for the semi-persistent scheduling signal is located; or puncturing, by the terminal, all random access resources in a slot in which the random access resource whose time location overlaps with the time location for the semi-persistent scheduling signal is located.

In a possible embodiment, the method further includes:

adding, by the terminal, a new random access resource in a $K^{th}$ uplink slot before or after an uplink slot in which a punctured random access resource is located, and using the new random access resource as an actually available random access resource, where K is a preset or preconfigured constant; or adding, by the terminal, a new random access resource in a frequency-domain location of an uplink slot in which the random access resource whose location does not overlap with the location of the actually sent downlink signal is located, and using the new random access resource as an actually available random access resource; or adding, by the terminal, a new random access resource in another orthogonal frequency division multiplexing OFDM symbol of an uplink slot in which the random access resource whose location does not overlap with the location of the actually sent downlink signal is located, and using the new random access resource as an actually available random access resource.

In a possible embodiment, the method further includes:

determining, by the terminal, a quantity of punctured random access resources based on a random access preamble format and a quantity of overlapping OFDM symbols that are between the actually sent downlink signal and the random access resource and that are in the slot in which the random access resource is located.

In a possible embodiment, before the determining, by the terminal based on the actually available random access resources and an association relationship between a downlink signal and a random access resource, a target random access resource corresponding to the actually sent downlink signal, the method further includes:

updating, by the terminal, the association relationship between a downlink signal and a random access resource based on the actually sent downlink signal(s) and the actually available random access resources, to obtain a new association relationship between a downlink signal and a random access resource.

According to a third aspect, this application provides a random access method, including:

determining, by a network device, an actually available random access resource based on time location information for a random access resource and time location information for a downlink signal actually sent by the network device, where a time location for the actually available random access resource does not overlap with the time location for the actually sent downlink signal;

determining, by the network device based on the actually available random access resources and an association relationship between a downlink signal and a random access resource, a target random access resource corresponding to the actually sent downlink signal; and receiving, by the network device based on the target random access resource corresponding to the actually sent downlink signal, a random access preamble sent by a terminal.

In a possible embodiment, the determining, by a network device, an actually available random access resource based on time location information for a random access resource and time location information for a downlink signal actually sent by the network device includes:

determining, by the network device based on the time location information for the random access resource and the time location information for the downlink signal actually sent by the network device, a random access resource whose time location overlaps with the time location for the actually sent downlink signal; and using, by the network device as the actually available random access resource, a random access resource whose time location does not overlap with the time location for the actually sent downlink signal.

In a possible embodiment, the downlink signal is one or more of the following: a downlink synchronization signal block, a system information block, remaining minimum system information, a new radio system information block 1 (NR SIB1), a new radio system information block 0 (NR SIB0), a semi-statically configured downlink subframe, a semi-statically configured slot, a semi-statically configured OFDM symbol, or a reserved downlink signal.

In a possible embodiment, the method further includes:

sending, by the network device, configuration information to the terminal, where the configuration information indicates one or more of the following: a slot in which the random access resource is located is based on a subcarrier spacing of a random access message 1, a slot in which the random access resource is located is based on a subcarrier spacing of a random access message 3, a slot in which the random access resource is located is based on a subcarrier spacing of uplink initial access bandwidth, a slot in which the random access resource is located is based on a subcarrier spacing of a downlink signal, or a length of a slot in which the random access resource is located.

In a possible embodiment, the time location for the downlink signal is determined based on one or more of the following: a slot occupied by the downlink signal, an OFDM symbol occupied by the downlink signal, or a downlink/uplink guard period, where the slot is based on a subcarrier spacing of the downlink signal.

In a possible embodiment, the method further includes:

determining, by the network device based on the time location information for the random access resource and time location information for a semi-persistent scheduling signal, a semi-persistent scheduling signal whose time location overlaps with the time location for the random access resource.

In a possible embodiment, before the determining, by the network device based on the actually available random access resources and an association relationship between a downlink signal and a random access resource, a target random access resource corresponding to the actually sent downlink signal, the method further includes:

updating, by the network device, the association relationship between a downlink signal and a random access resource based on the actually sent downlink signal(s) and the actually available random access resources, to obtain a new association relationship between a downlink signal and a random access resource.

According to a fourth aspect, this application provides a random access method, including:

when determining that a time location for an actually transmitted downlink signal overlaps with a time location for a random access resource, determining, by a network device, to puncture the random access resource whose time location overlaps with the time location for the actually sent downlink signal; or determining to puncture the random access resource whose time location overlaps with the time location for the actually sent downlink signal, and all random access resources that precede the random access resource whose time location overlaps with the time location for the actually sent downlink signal and that are in a slot in which the random access resource whose time location overlaps with the time location for the actually sent downlink signal is located; or determining to puncture all random access resources in a slot in which the random access resource whose time location overlaps with the time location for the actually sent downlink signal is located.

According to a fifth aspect, this application provides a terminal, including:

a determining module, configured to: determine an actually available random access resource based on time location information for a random access resource and time location information for a downlink signal actually sent by a network device, where a time location for the actually available random access resource does not overlap with the time location for the actually sent downlink signal; and determine, based on the actually available random access resources and an association relationship between a downlink signal and a random access resource, a target random access resource corresponding to the actually sent downlink signal; and a sending module, configured to send a random access preamble to the network device by using the target random access resource.

According to a sixth aspect, this application provides a terminal, including:

a determining module, configured to: when determining that a time location for an actually transmitted downlink signal overlaps with a time location for a random access resource, determine to puncture the random access resource whose time location overlaps with the time location for the actually sent downlink signal; or determine to puncture the random access resource whose time location overlaps with the time location for the actually sent downlink signal, and all random access resources that precede the random access resource whose time location overlaps with the time location for the actually sent downlink signal and that are in a slot in which the random access resource whose time location overlaps with the time location for the actually sent downlink signal is located; or determine to puncture all random access resources in a slot in which the random access resource whose time location overlaps with the time location for the actually sent downlink signal is located.

In a possible embodiment, the determining module is specifically configured to: determine, based on the time location information for the random access resource and the time location information for the downlink signal actually sent by the network device, the random access resource whose time location overlaps with the time location for the actually sent downlink signal; and determine to use, as the actually available random access resource, a random access resource whose time location does not overlap with the time location for the actually sent downlink signal.

In a possible embodiment, the determining module is further configured to: determine to puncture the random access resource whose time location overlaps with the time location for the actually sent downlink signal; or determine to puncture the random access resource whose time location overlaps with the time location for the actually sent downlink signal, and all the random access resources that precede the random access resource whose time location overlaps with the time location for the actually sent downlink signal and that are in the slot in which the random access resource whose time location overlaps with the time location for the actually sent downlink signal is located; or determine to puncture all the random access resources in the slot in which the random access resource whose time location overlaps with the time location for the actually sent downlink signal is located.

In a possible embodiment, the downlink signal is one or more of the following: a downlink synchronization signal block, a system information block, remaining minimum system information, a new radio system information block 1 (NR SIB1), a new radio system information block 0 (NR SIB0), a semi-statically configured downlink subframe, a semi-statically configured slot, a semi-statically configured OFDM symbol, or a reserved downlink signal.

In a possible embodiment, the method further includes:

a receiving module, configured to receive configuration information sent by the network device, where the configuration information indicates one or more of the following: the slot in which the random access resource is located is based on a subcarrier spacing of a random access message 1, the slot in which the random access resource is located is based on a subcarrier spacing of a random access message 3, the slot in which the random access resource is located is based on a subcarrier spacing of uplink initial access bandwidth, the slot in which the random access resource is located is based on a subcarrier spacing of a downlink signal, or a length of the slot in which the random access resource is located.

In a possible embodiment, the time location for the downlink signal is determined based on one or more of the following: a slot occupied by the downlink signal, an OFDM symbol occupied by the downlink signal, or a downlink/uplink guard period, where the slot is based on a subcarrier spacing of the downlink signal.

In a possible embodiment, the determining module is further configured to: determine, based on the time location information for the random access resource and time location information for a semi-persistent scheduling signal, a semi-persistent scheduling signal whose time location overlaps with the time location for the random access resource; and determine to puncture the semi-persistent scheduling signal whose time location overlaps with the time location for the random access resource.

In a possible embodiment, the determining module is further configured to: determine, based on the time location information for the random access resource and time location information for a semi-persistent scheduling signal, a random access resource whose time location overlaps with the time location for the semi-persistent scheduling signal; and determine to puncture the random access resource whose time location overlaps with the time location for the semi-persistent scheduling signal; or determine to puncture the random access resource whose time location overlaps with the time location for the semi-persistent scheduling signal, and all random access resources that precede the random access resource whose time location overlaps with the time location for the semi-persistent scheduling signal and that are in a slot in which the random access resource whose time location overlaps with the time location for the semi-persistent scheduling signal is located; or determine to puncture all random access resources in a slot in which the random access resource whose time location overlaps with the time location for the semi-persistent scheduling signal is located.

In a possible embodiment, the determining module is further configured to: determine to add a new random access resource in a $K^{th}$ uplink slot before or after an uplink slot in which a punctured random access resource is located, and to use the new random access resource as an actually available random access resource, where K is a preset or preconfigured constant; or determine to add a new random access resource in a frequency-domain location of an uplink slot in which the random access resource whose location does not overlap with the location of the actually sent downlink signal is located, and to use the new random access resource as an actually available random access resource; or determine to add a new random access resource in another orthogonal frequency division multiplexing OFDM symbol of an uplink slot in which the random access resource whose location does not overlap with the location of the actually sent downlink signal is located, and to use the new random access resource as an actually available random access resource.

In a possible embodiment, the determining module is further configured to determine a quantity of punctured random access resources based on a random access preamble format and a quantity of overlapping OFDM symbols that are between the actually sent downlink signal and the random access resource and that are in the slot in which the random access resource is located.

In a possible embodiment, the determining module is further configured to determine to update an association relationship between a downlink signal and a random access resource based on the actually sent downlink signal(s) and the actually available random access resources, to obtain a new association relationship between a downlink signal and a random access resource.

According to a seventh aspect, this application provides a network device, including:

a determining module, configured to: determine an actually available random access resource based on time location information for a random access resource and time location information for a downlink signal actually sent by the network device, where a time location for the actually available random access resource does not overlap with the time location for the actually sent downlink signal; and determine, based on the actually available random access resources and an association relationship between a downlink signal and a random access resource, a target random access resource corresponding to the actually sent downlink signal; and a receiving module, configured to receive, based on the target random access resource corresponding to the actually sent downlink signal, a random access preamble sent by a terminal.

According to an eighth aspect, this application provides a network device, including:

a determining module, configured to: when determining that a time location for an actually transmitted downlink signal overlaps with a time location for a random access resource, determine to puncture the random access resource whose time location overlaps with the time location for the actually sent downlink signal; or determine to puncture the random access resource whose time location overlaps with the time location for the actually sent downlink signal, and all random access resources that precede the random access resource whose time location overlaps with the time location for the actually sent downlink signal and that are in a slot in which the random access resource whose time location overlaps with the time location for the actually sent downlink signal is located; or determine to puncture all random access resources in a slot in which the random access resource whose time location overlaps with the time location for the actually sent downlink signal is located.

According to a ninth aspect, this application provides an apparatus. The apparatus includes a processor and a memory. The memory is configured to store a program. The processor invokes the program stored in the memory, to perform the method provided in the first aspect or the second aspect in this application. The apparatus may be a terminal, or may be a chip on a terminal.

According to a tenth aspect, this application provides an apparatus. The apparatus includes a processor and a memory. The memory is configured to store a program. The processor invokes the program stored in the memory, to perform the method provided in the third aspect or the fourth aspect in this application. The apparatus may be a network device, or may be a chip on a network device.

According to an eleventh aspect, this application provides a computer storage medium. The computer storage medium is configured to store a program. The program is used to perform any one of the methods according to the first to the fourth aspects.

According to the random access method, the terminal, and the network device that are provided in this application, the terminal determines the actually available random access resources based on the information about the location of the random access resource and the time location information for the downlink signal actually sent by the network device; determines, based on the actually available random access resources and the association relationship between a downlink signal and a random access resource, the target random access resource corresponding to the actually sent downlink signal; and further sends the random access preamble to the network device by using the target random access resource. This avoids a conflict between the actually sent downlink signal and the random access preamble sent in uplink.

DESCRIPTION OF EMBODIMENTS

The embodiments of this application may be applied to a wireless communications system. It should be noted that the wireless communications system mentioned in the embodiments of this application includes but is not limited to: a Narrowband Internet of Things (NB-IoT) system, a Global System for Mobile Communications (GSM), an Enhanced Data rates for GSM Evolution (EDGE) system, a Wideband Code Division Multiple Access (WCDMA) system, a Code Division Multiple Access 2000 (CDMA 2000) system, a Time Division-Synchronous Code Division Multiple Access (TD-SCDMA) system, a Long Term Evolution (LTE) system, and three application scenarios of a next-generation 5G mobile communications system: Enhanced Mobile Broadband (eMBB), URLLC, and massive machine type communication (mMTC).

In the embodiments of this application, a terminal includes but is not limited to a mobile station (MS), a mobile terminal, a mobile phone, a handset, a portal device, and the like. The terminal may communicate with one or more core networks through a radio access network (RAN). For example, the terminal may be a mobile phone (or referred to as a "cellular" phone) or a computer with a wireless communication function. The terminal may also be a portable, pocket-sized, handheld, computer built-in, or in-vehicle mobile apparatus or device.

Figure 1:
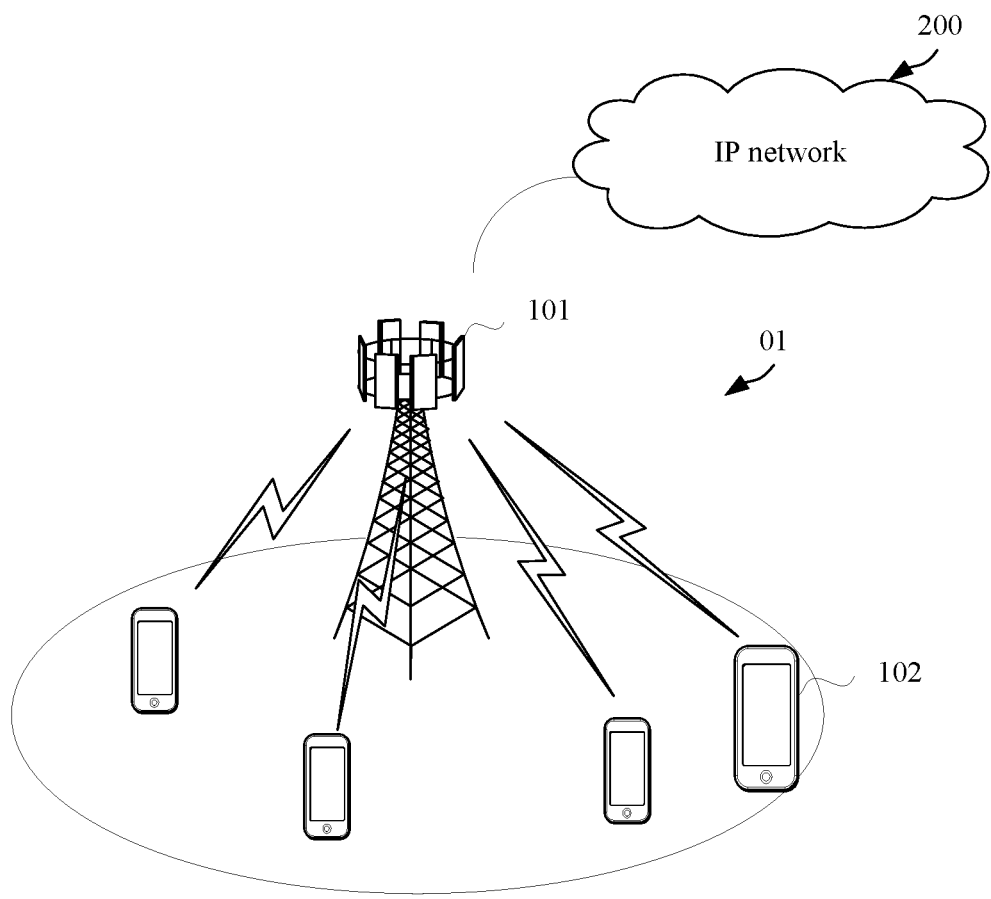
FIG. 1 is a schematic architectural diagram of a communications system according to this application.

FIG. 1 is a schematic architectural diagram of a communications system according to this application.

As shown in FIG. 1, the communications system 01 includes a network device 101 and a terminal 102. When the wireless communications network 01 includes a core network, the network device 101 may be further connected to the core network. The network device 101 may further communicate with an Internet Protocol (IP) network 200, such as the Internet, a private IP network, or another data network. A network device provides a service for a terminal in a coverage area of the network device. For example, as shown in FIG. 1, the network device 101 provides wireless access for one or more terminals in a coverage area of the network device 101. In addition, network devices may further communicate with each other.

The network device 101 may be a device configured to communicate with a terminal. For example, the network device 101 may be a base transceiver station (BTS) in a GSM system or a CDMA system; or may be a NodeB (NB) in a WCDMA system; or may be an evolved NodeB (eNB or eNodeB) in an LTE system, or a network-side device in a future 5G network. Alternatively, the network device may be a relay node, an access point, an in-vehicle device, or the like. In a device-to-device (D2D) communications system, the network device may alternatively be a terminal that functions as a base station. The terminal may include various handheld devices, in-vehicle devices, wearable devices, and computing devices that have a wireless communication function, or other processing devices connected to wireless modems; user equipments (UE) and mobile stations (MS) that are in various forms; and the like.

In this application, a random access (RACH) resource may include information such as a random access time and a random access frequency. The random access time may be an orthogonal frequency division multiplexing (OFDM) symbol, a mini-slot, a slot, a subframe, or a time segment whose duration is H basic time units; and indicates a time required for sending a predefined random access preamble. The random access frequency indicates bandwidth required for sending a predefined random access preamble. H is greater than 0. In an implementation, one random access resource is identified in two dimensions: a random access time and a random access frequency. In other words, one random access time and one random access frequency define one random access resource. In another implementation, one random access time and one random access frequency may define a plurality of random access resources.

One random access resource may also be referred to as one random access occasion (RACH occasion/RACH transmission occasion/RACH opportunity/RACH chance, RO), or one random access preamble or one set of a plurality of random access preambles that is on one random access time-frequency resource. In this application, the terms "a" or "an" is used to include one or more. Reference to an element in a singular is intended to mean "one or more" and not to mean "one and only one" unless specifically stated.

Figure 2:
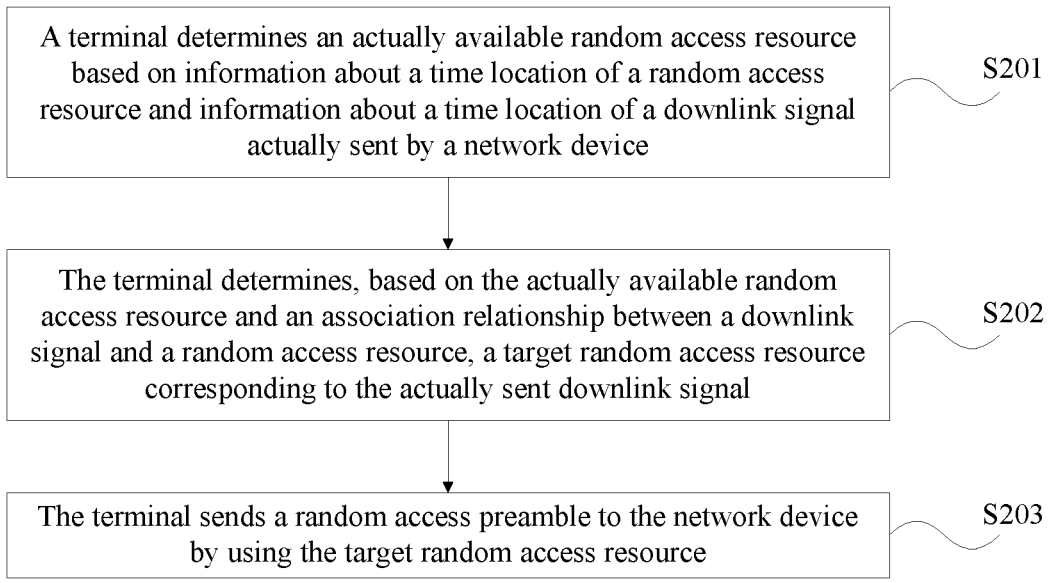
FIG. 2 is a schematic flowchart of a random access method according to an embodiment of this application.

FIG. 2 is a schematic flowchart of a random access method according to an embodiment of this application. As shown in FIG. 2, the method includes the following steps.

S201: A terminal determines an actually available random access resource based on time location information for a random access resource and time location information for a downlink signal actually sent by a network device.

A location of the actually available random access resource does not overlap with the location of the actually sent downlink signal.

Optionally, the network device sends first configuration information to the terminal, where the first configuration information carries one or more of the following information: a frame format configuration index, a semi-static uplink/downlink configuration (semi-static UL/DL configuration), semi-persistent downlink or uplink scheduling (semi-persistent scheduling), a random access configuration index, a random access preamble subcarrier spacing, indication information of the actually sent downlink signal, downlink signal set periodicity information, random access configuration periodicity (RACH configuration periodicity) information, uplink channel information, or slot format information (SFI); and/or the network device sends second configuration information to the terminal, where the second configuration information includes at least one of the following: a slot in which the random access resource is located is based on a subcarrier spacing of a random access message 1 (MSG1), a slot in which the random access resource is located is based on a subcarrier spacing of a random access message 3 (MSG3), a slot in which the random access resource is located is based on a subcarrier spacing of uplink initial access bandwidth, a slot in which the random access resource is located is based on a subcarrier spacing of a downlink signal, a slot in which the random access resource is located is based on a subcarrier spacing of partial downlink initial access bandwidth, or a length of a slot in which the random access resource is located.

The downlink signal may be one or more of the following: a synchronization signal block (SS block), a system information block, remaining minimum system information (RMSI), a new radio system information block 1 (NR SIB1), a new radio system information block 0 (NR SIB0), a reserved downlink signal, a semi-statically configured downlink subframe, a semi-statically configured slot, or a semi-statically configured OFDM symbol.

The actually transmitted downlink signal may be corresponding to one or more OFDM symbols. The downlink signal includes at least one of the following: a primary synchronization signal (PSS), a secondary synchronization signal (SSS), a physical broadcast signal (PBCH), a demodulation reference signal (DMRS). An SS block may also be referred to as an SS/PBCH block. A plurality of signals in the SS block or the SS/PBCH block may be sent by using a same antenna port.

Semi-static configuration means that an uplink/downlink communication configuration appears periodically based on duration of a configuration period. In other words, a corresponding uplink/downlink subframe, slot, or OFDM symbol appears periodically. The period may be one or two slots, 0.5 milliseconds, 1 millisecond, 2 milliseconds, 5 milliseconds, 10 milliseconds, or another value corresponding to a 120-kHz subcarrier spacing. Semi-persistent scheduling means that time and frequency resources used for uplink/downlink communication appear periodically based on duration of a scheduling period. In other words, a frequency resource in a corresponding uplink/downlink subframe, slot, or OFDM symbol appears periodically. The semi-persistent scheduling is also referred to as semi-static scheduling (semi-static scheduling).

It should be understood that the reserved downlink signal is downlink data and/or null data carried in a reserved resource element and/or resource block in a reserved time.

A downlink signal set includes one or more downlink signals.

The uplink channel information may include one or more of the following: uplink center frequency information, an uplink channel number, uplink channel bandwidth, a quantity of uplink frequency bands, an uplink frequency band start location, an uplink frequency band subcarrier offset value, an uplink frequency band resource block offset value, a quantity and/or bandwidth of partial uplink initial access bandwidth, a subcarrier spacing of partial uplink initial access bandwidth, or a quantity of random access resources. The uplink channel bandwidth may be total uplink channel bandwidth, or may be uplink initial access bandwidth. This is not limited in this application.

The terminal may obtain, based on the foregoing configuration information, the time location information for the random access resource, the time location information for the actually sent downlink signal, and the like.

Optionally, the semi-static uplink/downlink configuration is performed based on a same subcarrier width. For example, the semi-static uplink/downlink configuration is performed based on a subcarrier width of a downlink signal, RMSI, uplink random access information 1, or uplink random access information 3.

Optionally, the semi-static uplink/downlink configuration is performed based on a same subcarrier width. For example, the semi-static uplink/downlink configuration is performed based on a largest or smallest subcarrier in subcarriers of a downlink signal, RMSI, uplink random access information 1, and uplink random access information 3.

Optionally, the semi-static uplink/downlink configuration is performed based on different subcarrier widths. For example, downlink configuration is performed based on a largest or smallest subcarrier width in subcarrier widths of a downlink signal and RMSI; and uplink configuration is performed based on a largest or smallest subcarrier width in subcarrier widths of uplink random access information 1 and uplink random access information 3.

Optionally, the semi-static uplink/downlink configuration is performed based on a same subcarrier width. In a low-frequency scenario (a frequency band is lower than a first preset frequency band), configuration is performed based on a fixed subcarrier width (for example, 15 kHz). In a high-frequency scenario (a frequency band is higher than a second preset frequency band), configuration is performed based on another fixed subcarrier width (for example, 60 kHz). Alternatively, at a high and low frequency, configuration is performed based on a same subcarrier width (15 kHz or 60 kHz).

Optionally, the terminal may determine quantity and time information of uplink subframes, slots, and OFDM symbols in a system frame based on the frame format configuration index and/or the slot format information. Further, the terminal may determine, based on the random access configuration index and the random access preamble subcarrier spacing, quantity and time information of uplink subframes, slots, and OFDM symbols in which random access resources are located.

Further, the terminal determines the actually available random access resources with reference to the indication information of the actually sent downlink signal and the downlink signal set periodicity information.

S202: The terminal determines, based on the actually available random access resources and an association relationship between a downlink signal and a random access resource, a target random access resource corresponding to the actually sent downlink signal.

To be specific, the target random access resource corresponding to the actually sent downlink signal is determined from the actually available random access resources. In other words, uplink information is not sent by using a random access resource whose location overlaps (which may also be understood as partially overlapping, conflicting, occupying, and the like (overlap/conflict/occupy/overlay/intersect/cross) in this application) with the location of the actually sent downlink signal.

S203: The terminal sends a random access preamble to the network device by using the target random access resource.

In this embodiment, the terminal determines the actually available random access resources based on the information about the location of the random access resource and the time location information for the downlink signal actually sent by the network device; determines, based on the actually available random access resources and the association relationship between a downlink signal and a random access resource, the target random access resource corresponding to the actually sent downlink signal; and further sends the random access preamble to the network device by using the target random access resource. This avoids a conflict between the actually sent downlink signal and the random access preamble sent in uplink.

Correspondingly, a network-side device also determines an actually available random access resource and a target random access resource, to receive a specific random access preamble.

Figure 3:
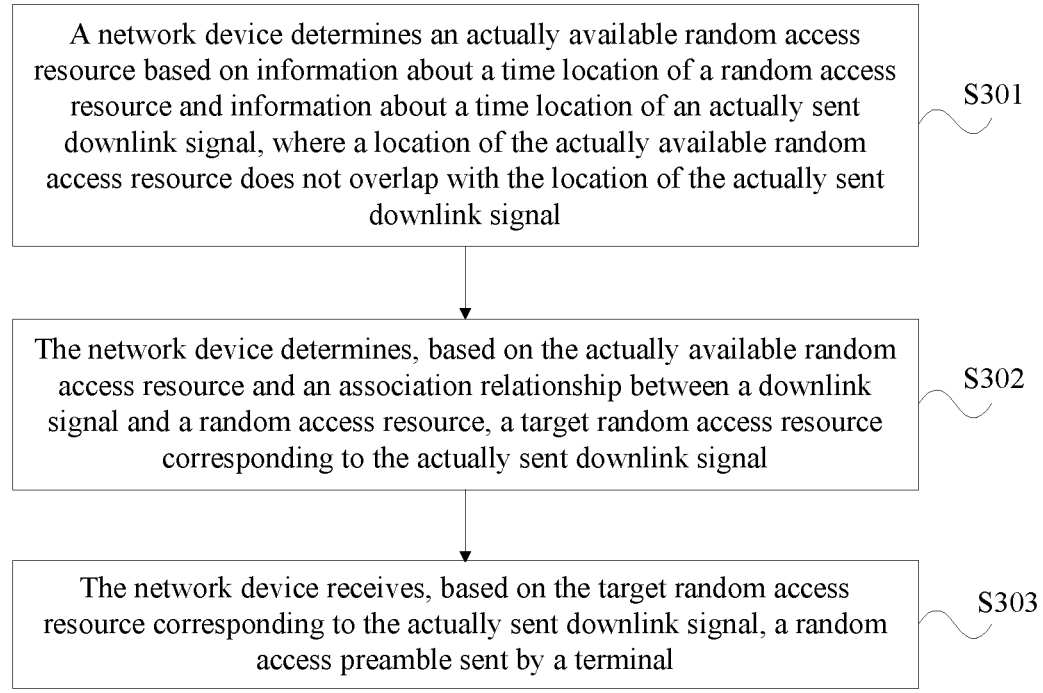
FIG. 3 is a schematic flowchart of a random access method according to another embodiment of this application.

FIG. 3 is a schematic flowchart of a random access method according to another embodiment of this application. As shown in FIG. 3, the method includes the following steps.

S301: A network device determines an actually available random access resource based on time location information for a random access resource and time location information for an actually sent downlink signal, where a location of the actually available random access resource does not overlap with the location of the actually sent downlink signal.

Similarly, the network device may determine quantity and time information of uplink subframes, slots, and OFDM symbols in a system frame based on a frame format configuration index and/or slot format information. Further, the network device may determine, based on a random access configuration index and a random access preamble subcarrier spacing, quantity and time information of uplink subframes, slots, and OFDM symbols in which random access resources are located.

Further, the network device determines the actually available random access resources with reference to indication information of the actually sent downlink signal and downlink signal set periodicity information.

S302: The network device determines, based on the actually available random access resources and an association relationship between a downlink signal and a random access resource, a target random access resource corresponding to the actually sent downlink signal.

S303: The network device receives, based on the target random access resource corresponding to the actually sent downlink signal, a random access preamble sent by a terminal.

It should be noted that the network device and the terminal follow a same rule to determine related parameters, such as the actually available random access resources, the association relationship between a downlink signal and a random access resource, and the target random access resource. To be specific, the network device is aware of random access resource on which the terminal sends random access preamble, and further receives the random access preamble on the random access resource, to complete a random access process; and the network device also determines random access resource on which the terminal does not send a random access preamble.

In this embodiment, the network device may determine the actually available random access resources based on the time location information for the random access resource and the time location information for the actually sent downlink signal, where the location of the actually available random access resources does not overlap with the location of the actually sent downlink signal; and determines, based on the actually available random access resources and the association relationship between a downlink signal and a random access resource, the target random access resource corresponding to the actually sent downlink signal; and further receives, based on the target random access resource corresponding to the actually sent downlink signal, the random access preamble sent by the terminal. This avoids a conflict between the actually sent downlink signal and the random access preamble sent in uplink.

The time location for the downlink signal may be determined based on one or more of the following: a slot occupied by the downlink signal, an OFDM symbol occupied by the downlink signal, or a downlink/uplink guard period, where the slot is based on a subcarrier spacing of the downlink signal, and the downlink/uplink guard period is a period of time.

Based on the foregoing embodiments, that a terminal determines an actually available random access resource based on time location information for a random access resource and time location information for a downlink signal actually sent by a network device may be: determining, based on the time location information for the random access resource and the time location information for the downlink signal actually sent by the network device, a random access resource whose time location overlaps with the time location for the actually sent downlink signal; and further using, as the actually available random access resource, a random access resource whose time location does not overlap with the time location for the actually sent downlink signal.

Specifically, the terminal determines that the random access resource whose time location overlaps with the time location for the actually sent downlink signal is unavailable, to be specific, does not send the random access preamble by using the random access resource whose time location overlaps with the time location for the actually sent downlink signal. Correspondingly, the random access resource whose time location does not overlap with the time location for the actually sent downlink signal is determined as the actually available random access resource.

That the terminal determines that the random access resource whose time location overlaps with the time location for the actually sent downlink signal is unavailable may be: puncturing (which may also be understood as deletion, release, and the like (puncture/release/delete/remove) in this application) the random access resource whose time location overlaps with the time location for the actually sent downlink signal.

According to a same principle, the terminal determines that the random access resource whose time location overlaps with the time location for the actually sent downlink signal is unavailable, to be specific, no random access preamble needs to be received on the part whose time location overlaps with the time location for the actually sent downlink signal.

In this application, a slot in which the random access resource is located is based on a subcarrier spacing of at least one of the following signals: a random access message 1 (MSG1), a random access message 3 (MSG3), uplink initial access bandwidth, downlink initial access bandwidth, a downlink synchronization signal block, system information (for example, a new radio system information block 1 (NR SIB1), or a new radio system information block 0 (NR SIB0)), remaining minimum system information (remaining minimum system information, RMSI), or other downlink signals (for example, a semi-statically configured downlink subframe and/or slot and/or OFDM symbol); or a length of a slot in which the random access resource is located is indicated by the network device.

The new radio system information block 1 (NR SIB1), the new radio system information block 0 (NR SIB0), and the downlink signal are semi-statically configured downlink subframes and/or slots and/or OFDM symbols. One or more of the downlink signals are reserved downlink signals.

In this application, the time location for the downlink signal is the slot and/or the OFDM symbol occupied by the downlink signal, where the slot and/or the OFDM symbol are/is based on the subcarrier spacing of the downlink signal.

The time location for the downlink signal may further include the downlink/uplink guard period (guard period, for example, used for uplink and downlink switchover). The downlink/uplink guard period is a period of time.

In this application, subcarrier spacings of a downlink synchronization signal block, a system information block, remaining minimum system information, a new radio system information block 1 (NR SIB1), a new radio system information block 0 (NR SIB0), a semi-statically configured downlink subframe and/or slot and/or OFDM symbol, a reserved downlink signal, a semi-persistently scheduled downlink subframe and/or slot and/or OFDM symbol, a downlink demodulation reference signal, and a downlink channel state information-reference signal are different from subcarrier spacings of an uplink PRACH, a semi-statically configured uplink subframe and/or slot and/or OFDM symbol, a reserved uplink signal, and a semi-persistently scheduled uplink subframe and/or slot and/or OFDM symbol. Therefore, corresponding time scales, such as slots or OFDM symbol lengths, are also different, and a difference between subcarriers of different signals needs to be considered during adjustment of a random access resource.

Specifically, an adjustment manner applied when a downlink synchronization signal block overlaps with a random access resource is used as an example for description. It should be noted that, in the embodiments herein, the downlink synchronization signal block is based on a time scale corresponding to a subcarrier of the downlink synchronization signal block, and the random access resource is based on a time scale corresponding to a subcarrier of a random access preamble. A similar resource puncturing and adjustment method is also applicable to adjustment performed when a time location for another downlink signal (with a different subcarrier spacing) overlaps with a time location for a random access resource.

In a specific implementation process, there may be the following cases (it should be noted that, in the accompanying drawings of this application, "SS/PBCH" identifies a downlink signal (a downlink synchronization signal block), and "PRACH" identifies a random access resource).

(1) The terminal punctures the random access resource whose time location overlaps with the time location for the actually sent downlink signal.

In this implementation, the terminal punctures the random access resource whose time location overlaps with the time location for the actually sent downlink signal and that is in a slot in which the random access resource whose time location overlaps with the time location for the actually sent downlink signal is located, and retains another random access resource, where the another random access resource may be further used as an actually available random access resource to continue to be used to send a random access preamble.

For example, the actually transmitted downlink signal occupies OFDM symbols i to i+3 in time domain. In this case, it is determined that random access resources in OFDM symbols iK to iK+4K−1 in time domain are not to be used (for example, are punctured). K identifies a multiple between a subcarrier spacing of a random access resource and a subcarrier spacing of a downlink signal. For example, K may be any one of the following: ¼, ½, 1, 2, or 4. i is an integer greater than or equal to 0.

Figure 4:
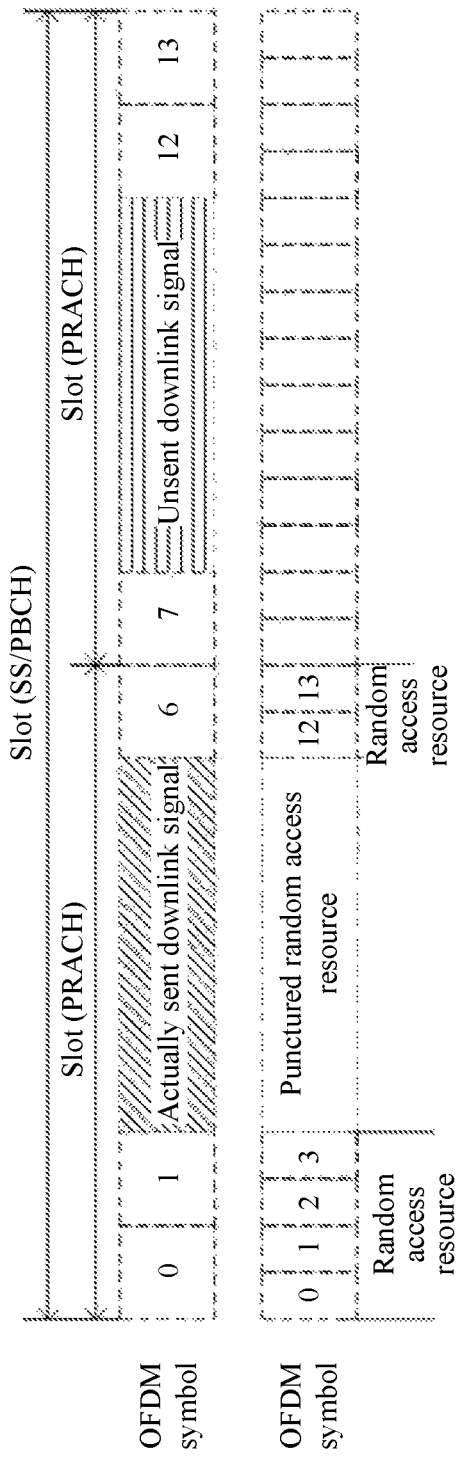
FIG. 4 is a schematic diagram of a resource structure according to this application.

FIG. 4 is a schematic diagram of a resource structure according to this application. As shown in FIG. 4, when K=2, it is assumed that a subcarrier spacing of a downlink signal is 15 kilohertz (15 kHz), and a subcarrier spacing of a random access resource subcarrier spacing is 30 kHz.

A maximum of one downlink signal may be transmitted within duration of a slot in which one random access resource is located. Specifically, the one downlink signal may be any downlink signal in a downlink signal set. As shown in FIG. 4, an actually sent downlink signal occupies OFDM symbols 2 to 5 in a slot, and a random access resource may be placed in OFDM symbols 12 and 13 in a slot on a time scale of a random access resource.

For another example, it is assumed that the actually sent downlink signal occupies OFDM symbols 8 to 11 in a slot, and a random access resource may be placed in OFDM symbols 10 to 13 in a slot on a time scale of a random access resource.

Figure 5:
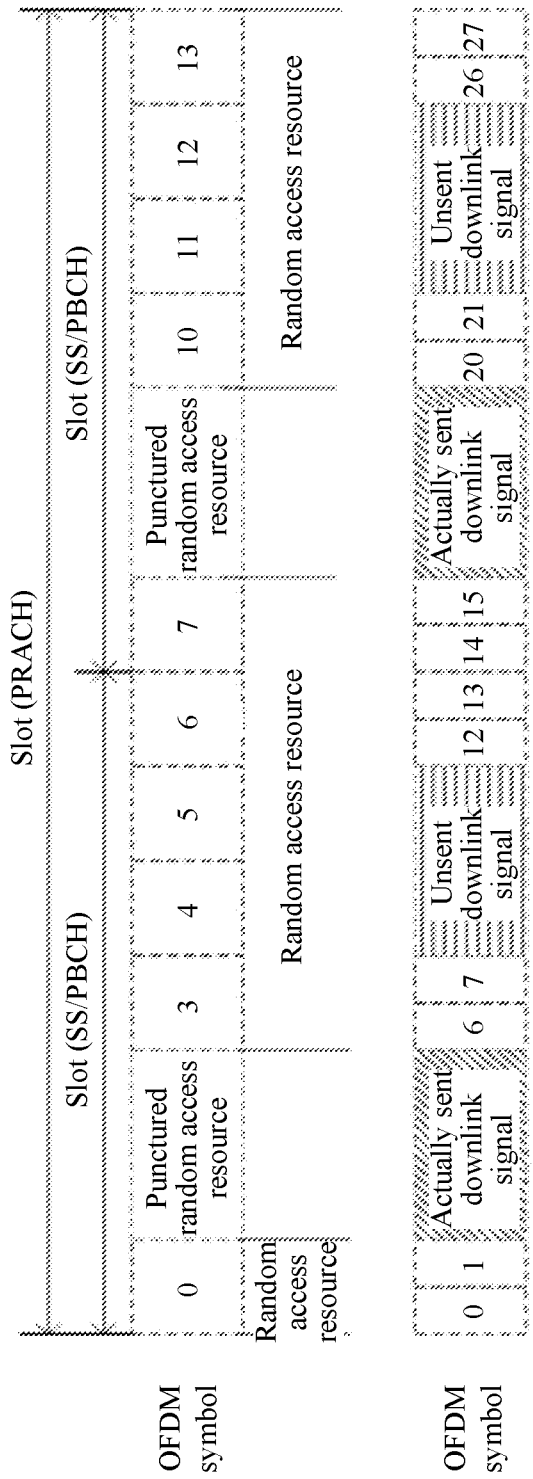
FIG. 5 is a schematic diagram of another resource structure according to this application.

FIG. 5 is a schematic diagram of another resource structure according to this application. As shown in FIG. 5, when K=½, it is assumed that a subcarrier spacing of a downlink signal is 30 kHz, and a subcarrier spacing of a random access resource is 15 kHz.

In this case, a maximum of four downlink signals may be transmitted within duration of a slot in which one random access resource is located. The four downlink signals are denoted as downlink signals 0 to 3, and may be any four downlink signals in a downlink signal set.

As shown in FIG. 5, an actually sent downlink signal occupies OFDM symbols 2 to 5 and/or OFDM symbols 8 to 11 in a slot, and a random access resource may be placed in OFDM symbols 10 to 13 in a slot on a time scale of a random access resource.

For another example, when the downlink signal 2 and the downlink signal 3 are not transmitted, a random access resource may be placed in OFDM symbols 6 to 13 in a slot on a time scale of a random access resource.

When the downlink signal 1, the downlink signal 2, and the downlink signal 3 are not transmitted, a random access resource may be placed in OFDM symbols 3 to 13 in a slot on a time scale of a random access resource.

Alternatively, when the actually sent downlink signal occupies OFDM symbols 2 to 5 or OFDM symbols 6 to 9 in a slot, a random access resource may be placed in OFDM symbols 10 to 13 in a slot on a time scale of a random access resource.

When the downlink signal 2 and the downlink signal 3 are not transmitted, a random access resource may be placed in OFDM symbols 5 to 13 in a slot on a time scale of a random access resource.

When the downlink signal 1, the downlink signal 2, and the downlink signal 3 are not transmitted, a random access resource may be placed in OFDM symbols 3 to 13 in a slot on a time scale of a random access resource.

It should be noted that, if a random access resource is configured based on unslotted scheduling, the random access resource may be placed in an unslotted location occupied by an untransmitted downlink signal. For example, in unslotted scheduling based on seven OFDM symbols (on a time scale corresponding to a subcarrier spacing of a random access resource), when the downlink signal 1 is not transmitted but the downlink signal 2 is transmitted, OFDM symbols 3 to 6 of a time resource occupied by the downlink signal may be used to place a random access resource. Alternatively, when the downlink signals 0 and 1 are not transmitted but the downlink signal 2 is transmitted, OFDM symbols 0 to 6 of a time resource occupied by the downlink signals may be used to place a random access resource.

For another example, it is assumed that a subcarrier spacing of a downlink signal is 120 kHz, and a subcarrier spacing of a random access resource is 60 kHz. In this case, a maximum of four downlink signals may be transmitted within duration of a slot in which one random access resource is located. For example, the four downlink signals are denoted as downlink signals 0 to 3, and may be any four downlink signals in a downlink signal set.

For example, transmission locations of the downlink signals are respectively OFDM symbols 4 to 7, 8 to 11, 16 to 19, and 20 to 23 in two adjacent slots (on a downlink signal time scale). When the downlink signal 2 is transmitted but the downlink signal 3 is not transmitted, a random access resource may be placed in OFDM symbols 10 to 13 in a slot on a time scale of a random access resource.

When the downlink signal 2 and the downlink signal 3 are not transmitted, a random access resource may be placed in OFDM symbols 6 to 13 in a slot on a time scale of a random access resource.

When the downlink signal 1, the downlink signal 2, and the downlink signal 3 are not transmitted, a random access resource may be placed in OFDM symbols 4 to 13 in a slot k on a time scale of a random access resource.

If a random access resource is configured based on unslotted scheduling (to be specific, OFDM symbols occupied by at least one configured random access resource in time are less than one slot or 14 OFDM symbols, for example, the random access resource occupies two, four, or seven OFDM symbols, and a time scale of the OFDM symbols may be the same as or different from a time scale of the random access resource), the random access resource may be placed in an unslotted location occupied by an untransmitted downlink signal. Specifically, in unslotted scheduling based on seven OFDM symbols (on a time scale corresponding to a subcarrier spacing of a random access resource), when the downlink signal 1 is not transmitted but the downlink signal 2 is transmitted, OFDM symbols 4 to 6 of a time resource occupied by the downlink signal may be used to place a random access resource.

Alternatively, when the downlink signals 0 and 1 are not transmitted but the downlink signal 2 is transmitted, OFDM symbols 0 to 6 of a time resource occupied by the downlink signals may be used to place a random access resource.

Alternatively, it is assumed that a subcarrier spacing of a downlink signal is 240 kHz, and a subcarrier spacing of a random access resource is 120 kHz. In this case, a maximum of four downlink signals may be transmitted within duration of a slot in which one random access resource is located. For example, the four downlink signals are denoted as downlink signals 0 to 3, and may be any four downlink signals in a downlink signal set.

For example, transmission locations of the four downlink signals are respectively OFDM symbols 8 to 11, 12 to 15, 16 to 19, and 20 to 23 in two slots (on a downlink signal time scale). When the downlink signal 2 is transmitted but the downlink signal 3 is not transmitted, a random access resource may be placed in OFDM symbols 10 to 13 in a slot on a time scale of a random access resource.

When the downlink signal 2 and the downlink signal 3 are not transmitted, a random access resource may be placed in OFDM symbols 8 to 13 in a slot on a time scale of a random access resource.

When the downlink signal 1, the downlink signal 2, and the downlink signal 3 are not transmitted, a random access resource may be placed in OFDM symbols 6 to 13 in a slot k on a time scale of a random access resource.

If a random access resource is configured based on unslotted scheduling, the random access resource may be placed in an unslotted location occupied by an untransmitted downlink signal. For example, in unslotted scheduling based on seven OFDM symbols (on a time scale corresponding to a subcarrier spacing of a random access resource), when the downlink signal 1 is not transmitted but the downlink signal 2 is transmitted, an OFDM symbol 6 of a time resource occupied by the downlink signal may be used to place a random access resource. Alternatively, when the downlink signals 0 and 1 are not transmitted but the downlink signal 2 is transmitted, OFDM symbols 0 to 6 of a time resource occupied by the downlink signals may be used to place a random access resource.

Alternatively, transmission locations of the four downlink signals are respectively OFDM symbols 4 to 7, 8 to 11, 12 to 15, and 16 to 19 in two slots (on a downlink signal time scale). When the downlink signal 2 is transmitted but the downlink signal 3 is not transmitted, a random access resource may be placed in OFDM symbols 8 to 13 in a slot on a time scale of a random access resource.

When the downlink signal 2 and the downlink signal 3 are not transmitted, a random access resource may be placed in OFDM symbols 6 to 13 in a slot on a time scale of a random access resource.

When the downlink signal 1, the downlink signal 2, and the downlink signal 3 are not transmitted, a random access resource may be placed in OFDM symbols 4 to 13 in a slot k on a time scale of a random access resource.

If a random access resource is configured based on unslotted scheduling, the random access resource may be placed in an unslotted location occupied by an untransmitted downlink signal. For example, in unslotted scheduling based on seven OFDM symbols (on a time scale corresponding to a subcarrier spacing of a random access resource), when the downlink signals 1 and 2 are not transmitted but the downlink signal 3 is transmitted, OFDM symbols 4 to 6 of a time resource occupied by the downlink signals may be used to place a random access resource. Alternatively, when the downlink signals 0 to 2 are not transmitted but the downlink signal 3 is transmitted, OFDM symbols 0 to 6 of a time resource occupied by the downlink signals may be used to place a random access resource.

Figure 6:
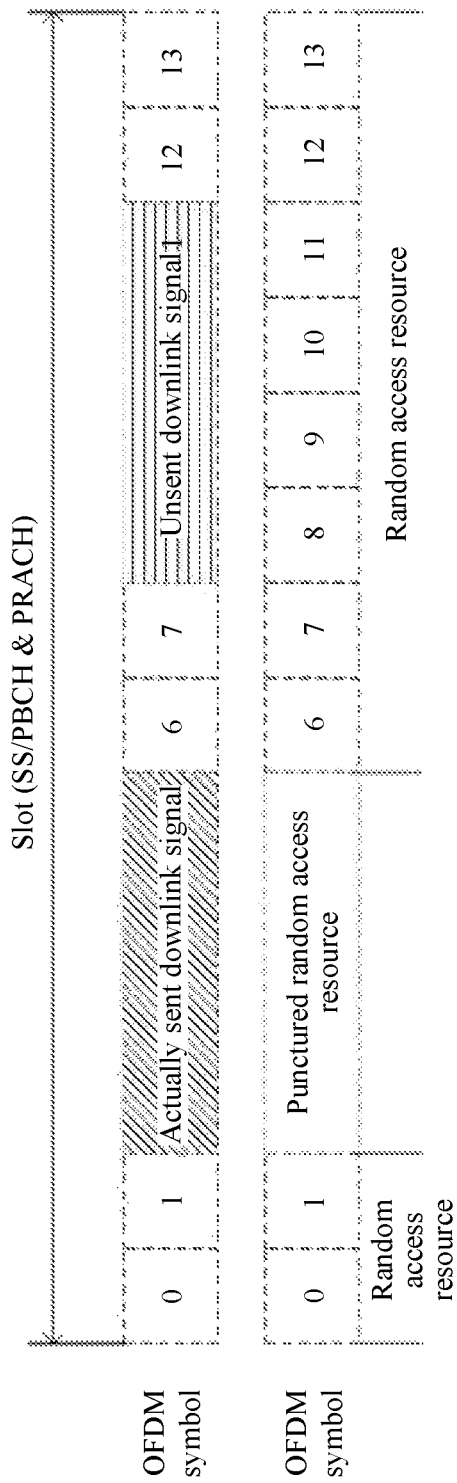
FIG. 6 is a schematic diagram of another resource structure according to this application.

FIG. 6 is a schematic diagram of another resource structure according to this application. As shown in FIG. 6, K=1, in other words, a subcarrier spacing of a downlink signal is the same as a subcarrier spacing of a random access resource, and both may be any one of 15 kHz, 30 kHz, or 120 kHz.

A maximum of two downlink signals may be transmitted within duration of a slot in which one random access resource is located. For example, the two downlink signals are denoted as downlink signals 0 and 1, and may be any two downlink signals in a downlink signal set.

As shown in FIG. 6, the first actually sent downlink signal 0 occupies OFDM symbols 2 to 5 in a slot. In this case, if the downlink signal 1 is not transmitted in the slot, a random access resource may be placed in OFDM symbols 6 to 13, occupied by the downlink signal, at a slot tail. For another example, the first downlink signal 0 occupies OFDM symbols 4 to 7 in a slot. In this case, if the downlink signal 1 is not transmitted in the slot, a random access resource may be placed in OFDM symbols 8 to 13, occupied by the downlink signal, at a slot tail.

If a random access resource is configured based on unslotted scheduling (based on less than 14 OFDM symbols, for example, two, four, or seven OFDM symbols), the random access resource may be placed in an unslotted location (an OFDM symbol location) occupied by an untransmitted downlink signal. Particularly, unslotted scheduling based on seven OFDM symbols is used as an example. When the downlink signal 0 is not transmitted but the downlink signal 1 is transmitted, OFDM symbols 0 to 6 of a time resource occupied by the downlink signal may be used to place a random access resource.

In another possibility, K=¼, and it is assumed that a subcarrier spacing of a downlink signal is 240 kHz, and a subcarrier spacing of a random access resource is 60 kHz.

In this case, a maximum of eight downlink signals may be transmitted within duration of a slot in which one random access resource is located. For example, the eight downlink signals are denoted as downlink signals 0 to 7, and may be any eight downlink signals in a downlink signal set.

For example, transmission locations of the eight downlink signals are respectively OFDM symbols 8 to 11, 12 to 15, 16 to 19, 20 to 23, 32 to 35, 36 to 39, 40 to 43, and 44 to 47 in four slots (on a downlink signal time scale). When the downlink signal 6 is transmitted but the downlink signal 7 is not transmitted, a random access resource may be placed in OFDM symbols 11 to 13 in a slot on a time scale of a random access resource.

When the downlink signal 5 is transmitted but the downlink signals 6 and 7 are not transmitted, a random access resource may be placed in OFDM symbols 10 to 13 in a slot on a time scale of a random access resource.

When the downlink signal 4 is transmitted but the downlink signals 5 to 7 are not transmitted, a random access resource may be placed in OFDM symbols 9 to 13 in a slot on a time scale of a random access resource.

When the downlink signal 3 is transmitted but the downlink signals 4 to 7 are not transmitted, a random access resource may be placed in OFDM symbols 7 to 13 in a slot on a time scale of a random access resource.

When the downlink signal 2 is transmitted but the downlink signals 6 and 7 are not transmitted, a random access resource may be placed in OFDM symbols 5 to 13 in a slot on a time scale of a random access resource.

When the downlink signal 1 is transmitted but the downlink signals 2 to 7 are not transmitted, a random access resource may be placed in OFDM symbols 4 to 13 in a slot on a time scale of a random access resource.

When the downlink signal 1 is transmitted but the downlink signals 1 to 7 are not transmitted, a random access resource may be placed in OFDM symbols 3 to 13 in a slot on a time scale of a random access resource.

If a random access resource is configured based on unslotted scheduling, the random access resource may be placed in an unslotted location occupied by an untransmitted downlink signal. For example, in unslotted scheduling based on seven OFDM symbols (on a time scale corresponding to a subcarrier spacing of a random access resource), when the downlink signal 3 is not transmitted but any one of the downlink signals 4 to 7 is transmitted, OFDM symbols 5 and 6 of a time resource occupied by the downlink signal may be used to place a random access resource. Alternatively, when the downlink signals 2 and 3 are not transmitted but any one of the downlink signals 4 to 7 is transmitted, OFDM symbols 4 to 6 of a time resource occupied by the downlink signals may be used to place a random access resource. Alternatively, when the downlink signals 1 to 3 are not transmitted but any one of the downlink signals 4 to 7 is transmitted, OFDM symbols 3 to 6 of a time resource occupied by the downlink signals may be used to place a random access resource. Alternatively, when the downlink signals 0 and 3 are not transmitted but any one of the downlink signals 4 to 7 is transmitted, OFDM symbols 0 to 6 of a time resource occupied by the downlink signals may be used to place a random access resource.

(2) The terminal punctures the random access resource whose time location overlaps with the time location for the actually sent downlink signal, and all random access resources that precede the random access resource whose time location overlaps with the time location for the actually sent downlink signal and that are in a slot in which the random access resource whose time location overlaps with the time location for the actually sent downlink signal is located.

Figure 7:
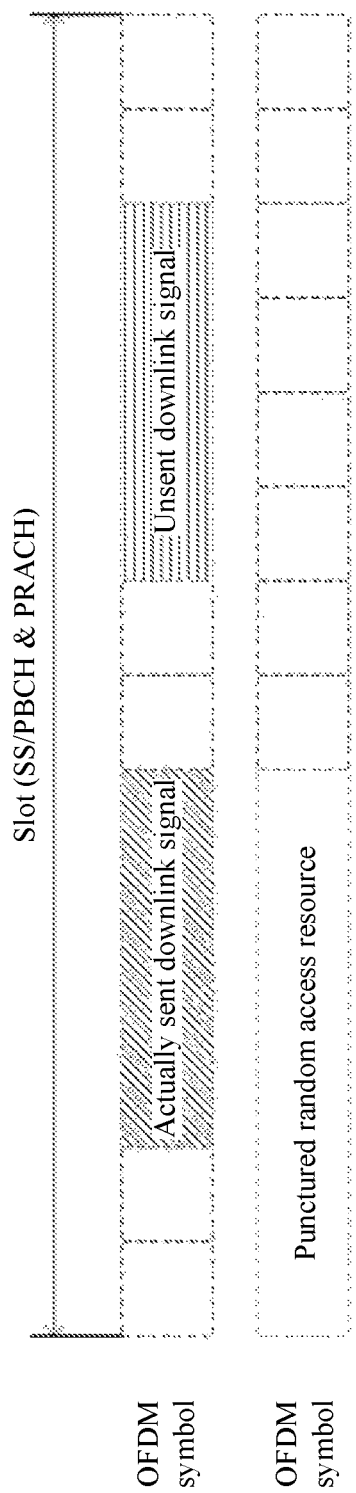
FIG. 7 is a schematic diagram of another resource structure according to this application.

FIG. 7 is a schematic diagram of another resource structure according to this application. As shown in FIG. 7, it is assumed that K=1.

It is determined that no random access preamble is to be sent on the random access resource whose time location overlaps with the time location for the actually sent downlink signal. In addition, it is determined that no random access preamble is to be sent on a random access resource that precedes this part of overlapping random access resource and that is in the current slot either.

It should be noted that a random access preamble is sent in uplink, and a downlink signal is sent by the network device in downlink. The random access resource that precedes this part of overlapping random access resource and that is in the current slot is also punctured, to avoid frequent uplink and downlink switchover.

(3) The terminal punctures all random access resources in a slot in which the random access resource whose time location overlaps with the time location for the actually sent downlink signal is located.

Figure 8:
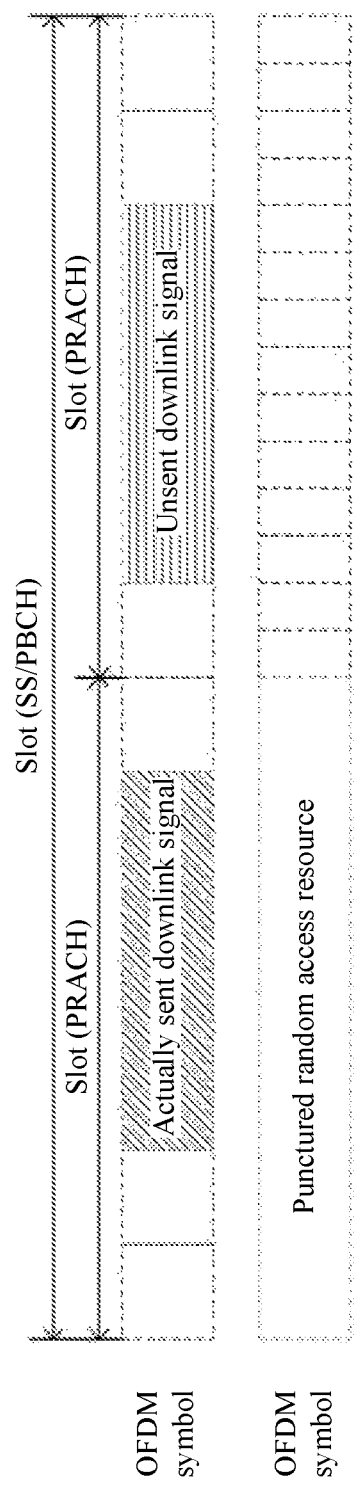
FIG. 8 is a schematic diagram of another resource structure according to this application.

FIG. 8 is a schematic diagram of another resource structure according to this application. As shown in FIG. 8, it is assumed that K=2.

Similar to that in (2), to better avoid frequent uplink and downlink switchover, it is determined that no random access preamble is to be sent in the slot in which the random access resource whose time location overlaps with the time location for the actually sent downlink signal is located.

It should be noted that a manner of determining the actually available random access resources by the network device may be used with reference to that used on the terminal side. Details are not described again.

Based on the foregoing embodiments, because some original random access resources are not used, in an implementation, an actually available random access resource needs to be added.

Optionally, an available uplink slot and an uplink OFDM symbol location in which no random access resource is placed may be first determined in a random access configuration period based on slot format configuration information (slot format information) and a downlink or uplink frame format configuration.

Further, an added actually available random access resource may be determined based on a quantity of punctured random access resources. Specifically, a time location for the added actually available random access resource, a quantity of added actually available random access resources in frequency domain, and the like may be determined. The time location for the added random access resource may be at least one of a semi-statically configured uplink subframe, a semi-statically configured uplink slot, or a semi-statically configured uplink OFDM symbol. In another implementation, the time location for the added random access resource may be a semi-statically configured undetermined uplink or downlink subframe, slot, or OFDM symbol. The undetermined uplink or downlink subframe, slot, or OFDM symbol is also referred to as an unknown subframe, slot, or OFDM symbol; and means that whether the subframe, slot, or OFDM symbol is in an uplink or downlink direction is not determined in random access; or means that the subframe, slot, or OFDM symbol is dynamically configured or scheduled through RRC, MAC CE, or DCI signaling in an uplink or downlink direction of the subframe, slot, or OFDM symbol.

Correspondingly, the network device also determines, in a same manner as the terminal, a time location for an added actually available random access resource, a quantity of added actually available random access resources in frequency domain, and the like, to ensure that random access preambles are to be received on some specific random access resources.

In specific implementation, a random access resource may be added in time domain, frequency domain, or another uplink OFDM symbol location.

(1) In an optional solution, the terminal adds an actually available random access resource in an uplink slot different from an uplink slot in which a punctured random access resource is located.

For example, the terminal adds a new random access resource in an uplink slot adjacent to the uplink slot in which the punctured random access resource is located, and uses the new random access resource as an actually available random access resource. For example, the random access resource is added in a $(K1)^{th}$ uplink subframe, slot, or OFDM symbol before the uplink slot in which the punctured random access resource is located. For another example, the random access resource is added in a $(K2)^{th}$ uplink subframe, slot, or OFDM symbol before the uplink slot in which the punctured random access resource is located. K1 and K2 are non-negative integers. Optionally, K1 and K2 are preset values, or values determined according to a preset rule. For example, K1 and K2 each are fixedly one slot. Optionally, a quantity of added random access resources is different from, for example, greater than, a quantity of punctured random access resources. Optionally, a quantity of added random access resources is different from, for example, less than, a quantity of punctured random access resources. Optionally, a quantity of random access resources to be added is determined based on a quantity of available uplink subframes, slots, or OFDM symbols.

Figure 9:
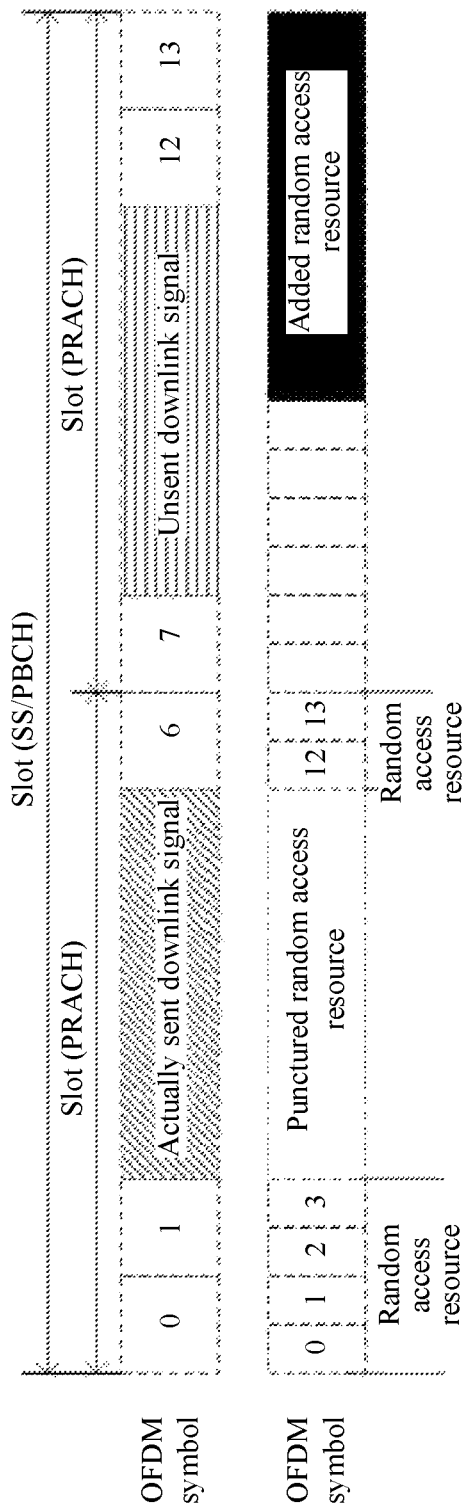
FIG. 9 is a schematic diagram of still another resource structure according to this application.
Figure 10:
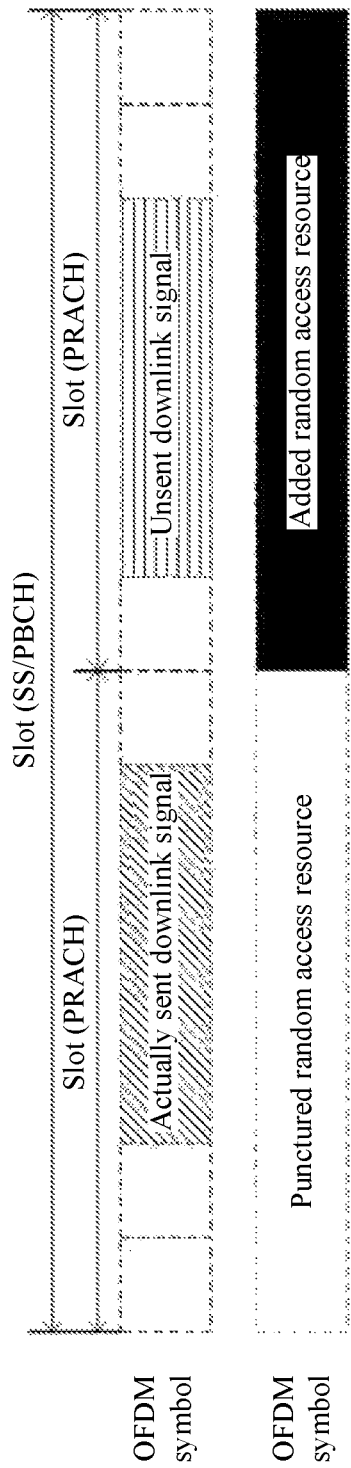
FIG. 10 is a schematic diagram of another resource structure according to this application.

FIG. 9 is a schematic diagram of still another resource structure according to this application. FIG. 10 is a schematic diagram of another resource structure according to this application.

As shown in FIG. 9 and FIG. 10, no downlink signal is transmitted in an uplink slot adjacent to an uplink slot in which a punctured random access resource is located, and it is determined that some or all resources in the slot are used to transmit a random access preamble.

(2) In another optional solution, the terminal adds a new random access resource in a frequency-domain location of an uplink slot in which a random access resource whose location does not overlap with the location of the actually sent downlink signal is located, and uses the new random access resource as an actually available random access resource.

Figure 11:
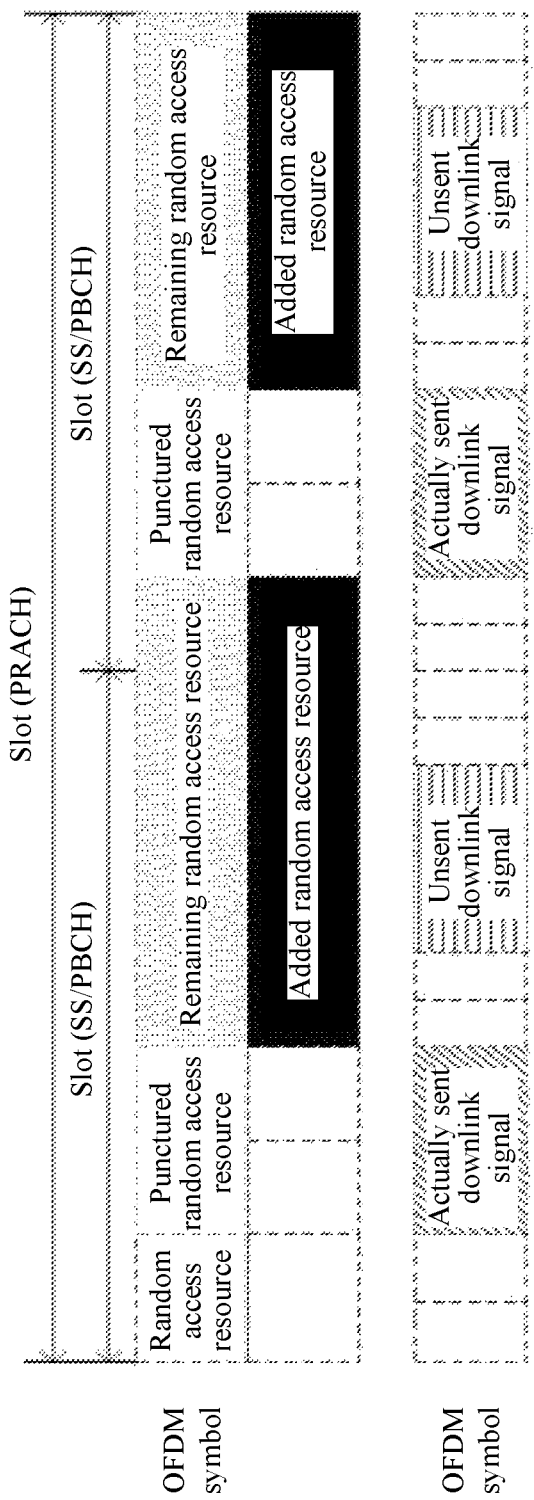
FIG. 11 is a schematic diagram of still another resource structure according to this application.
Figure 12:
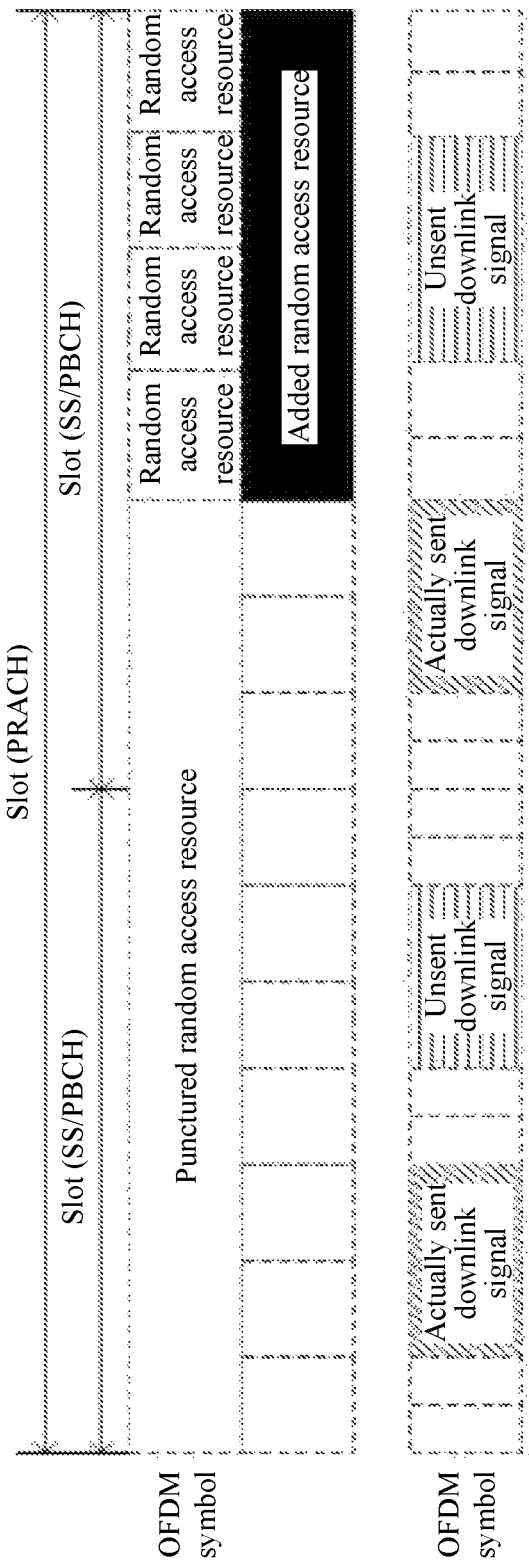
FIG. 12 is a schematic diagram of another resource structure according to this application.

FIG. 11 is a schematic diagram of still another resource structure according to this application. FIG. 12 is a schematic diagram of another resource structure according to this application.

As shown in FIG. 11 and FIG. 12, a random access resource is added in frequency domain, and the newly added random access resource does not overlap with an actually sent downlink signal in time either.

Optionally, a quantity of random access resources added in frequency domain does not exceed channel bandwidth or initial uplink access bandwidth configured by the network device.

(3) In still another optional solution, the terminal adds a new random access resource in another OFDM symbol of an uplink slot in which a random access resource whose location does not overlap with the location of the actually sent downlink signal is located, and uses the new random access resource as an actually available random access resource. Optionally, a quantity of random access resources to be added is determined based on a quantity of available uplink subframes, slots, or OFDM symbols.

Figure 13:
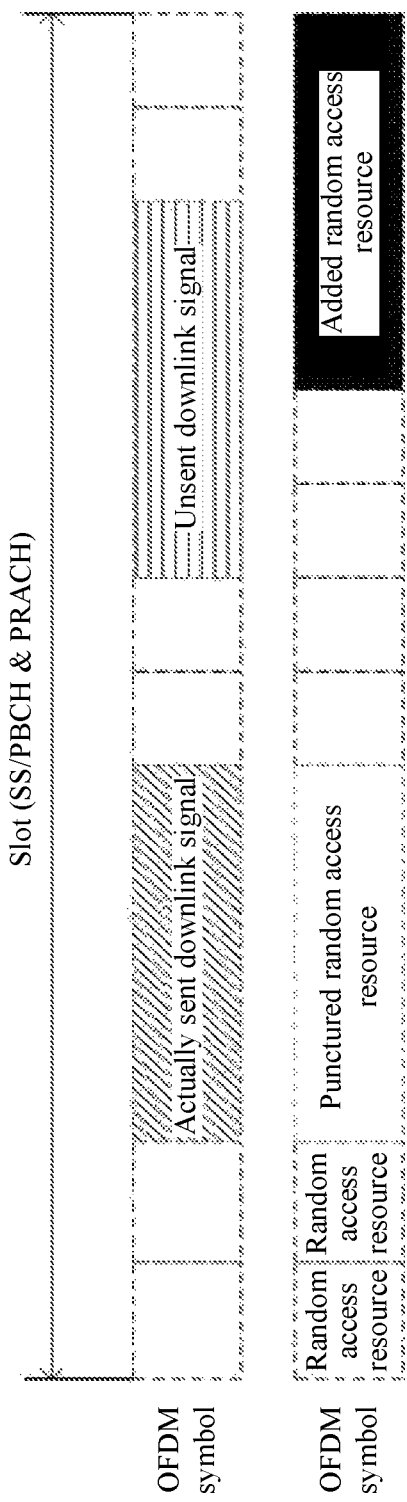
FIG. 13 is a schematic diagram of still another resource structure according to this application.
Figure 14:
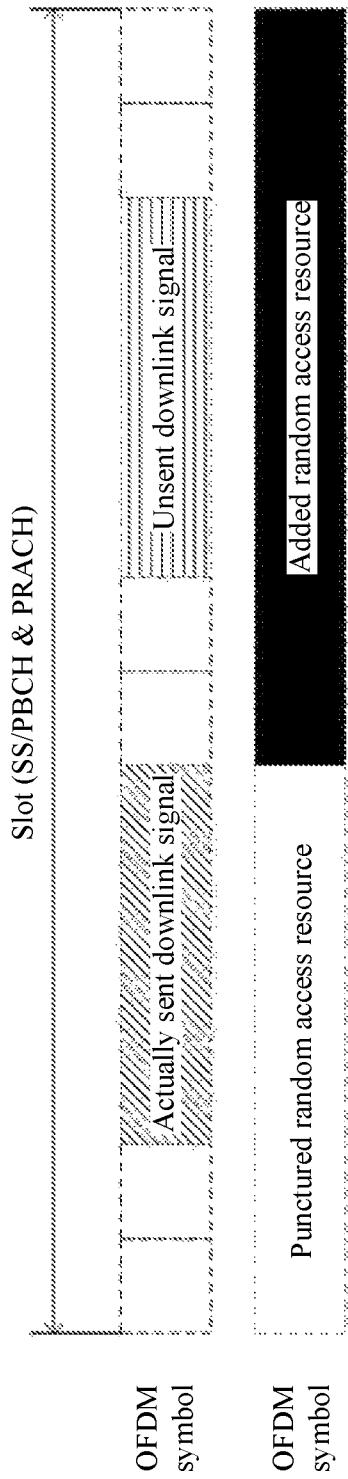
FIG. 14 is a schematic diagram of another resource structure according to this application.

FIG. 13 is a schematic diagram of still another resource structure according to this application. FIG. 14 is a schematic diagram of another resource structure according to this application.

As shown in FIG. 13 and FIG. 14, a new random access resource is added in another OFDM symbol of a slot in which a punctured random resource is located, and is used as an actually available random access resource.

Optionally, in time domain, the added random access resource may be evenly distributed in other uplink slots or OFDM symbol locations in a random access configuration period. This is not limited herein.

(4) In an optional solution, the network device may indicate an uplink time location for adding a random access resource, and the terminal adds a random access resource in the uplink time location indicated by the network device.

There may be an alternative random access resource in the uplink time location for the random access resource that is indicated by the network device. When a time location for an actually sent downlink signal overlaps with a time location for a random access resource, or a quantity of random access resources whose time locations overlap with a time location for an actually sent downlink signal is greater than a first preset threshold, or a quantity of actually sent downlink signals is greater than a second preset threshold, the alternative random access resource is activated.

It should be noted that different identifiers may be configured for the foregoing four solutions for adding a random access resource. For example, two bits are used for identification. The network device adds an identifier of "solution for adding a random access resource" to the configuration information, so that the terminal knows which solution is to be used to add a random access resource.

In addition, when the terminal sends a random access preamble on a newly added random access resource, a sending method is similar to a previous sending method. This is not limited herein.

Optionally, after it is determined that some random access resources are to be punctured, the random access configuration period may be further adjusted.

In a manner, random access resources in original N random access configuration periods may be adjusted to be in M new random access configuration periods. N and M may be any integers greater than 0. In a new random access configuration period, there is no random access resource whose time location overlaps with a time location for a downlink signal.

Optionally, a total quantity of random access resources in the N random access configuration periods before the adjustment is greater than a total quantity of random access resources in the M new random access configuration periods after the adjustment; or a total quantity of random access resources in the N random access configuration periods before the adjustment is equal to a total quantity of random access resources in the M new random access configuration periods after the adjustment; or a total quantity of random access resources in the N random access configuration periods before the adjustment is less than a total quantity of random access resources in the M new random access configuration periods after the adjustment.

Optionally, a total quantity of random access resources in one random access configuration period before the adjustment is greater than a total quantity of random access resources in one new random access configuration period after the adjustment; or a total quantity of random access resources in one random access configuration period before the adjustment is equal to a total quantity of random access resources in one new random access configuration period after the adjustment; or a total quantity of random access resources in one random access configuration period before the adjustment is less than a total quantity of random access resources in one new random access configuration period after the adjustment.

It should be noted that the adjusting the random access configuration period may include: adding and/or puncturing a random access resource.

Figure 15:
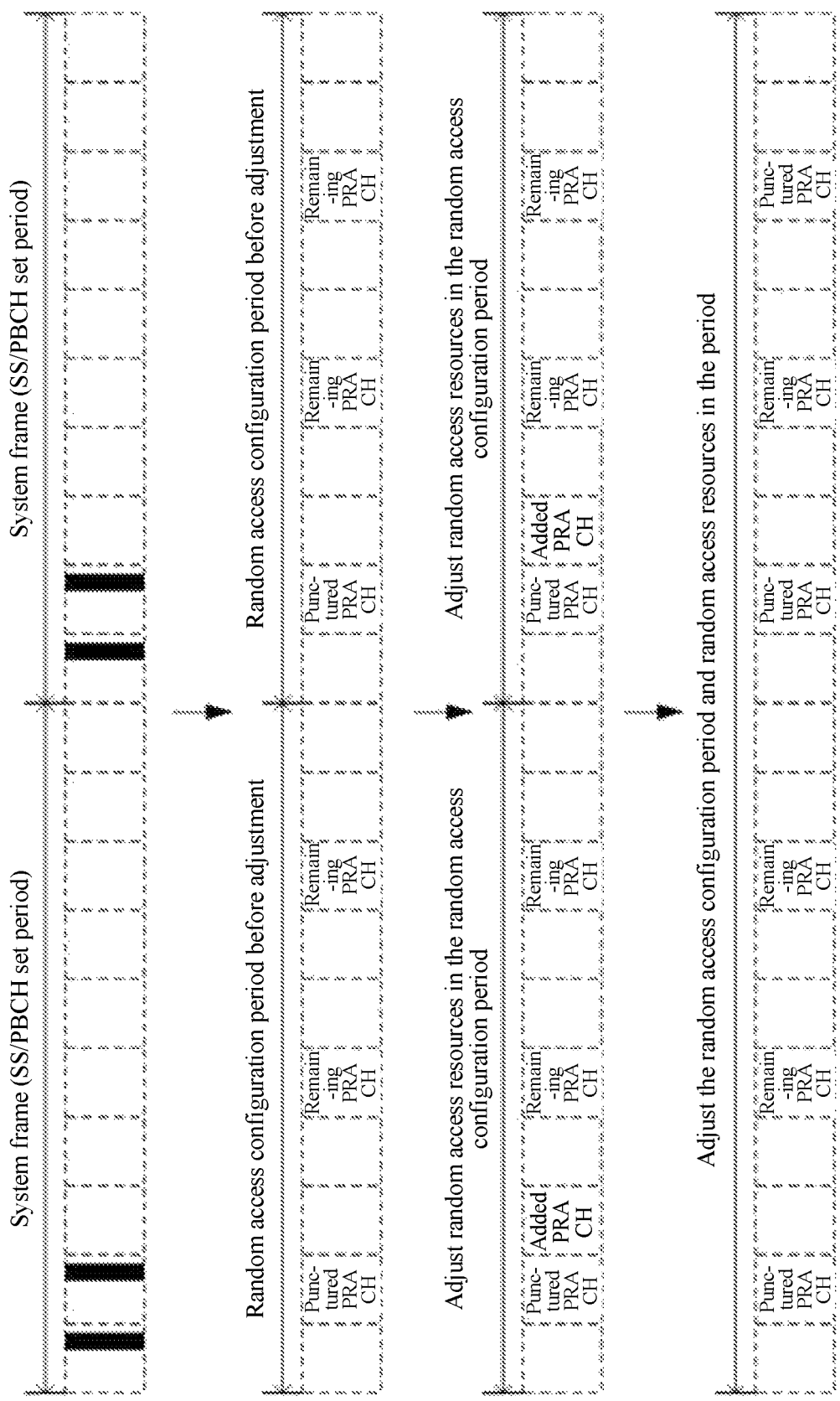
FIG. 15 is a schematic diagram of still another resource structure according to this application.

FIG. 15 is a schematic diagram of still another resource structure according to this application. As shown in FIG. 15, an actually transmitted downlink signal, namely, a black part in a first row, is first determined.

Further, a random access configuration period is adjusted by adding and/or puncturing a random access resource.

Based on the foregoing embodiments, before S201, a random access resource adjustment manner may be further determined based on one or more of the actually sent downlink signal, a period for actually sending a downlink signal, or a quantity of random access resources that are in one random access configuration period and whose time locations overlap with the time location for the actually sent downlink signal.

For example, when the quantity of random access resources that are in one random access configuration period and whose time locations overlap with the time location for the actually sent downlink signal is greater than a first preset threshold, it is determined that a random access resource is to be added. For a specific manner of adding a random access resource, refer to the embodiments shown in FIG. 9 to FIG. 14. Details are not described herein again.

Alternatively, when the quantity of random access resources that are in one random access configuration period and whose time locations overlap with the time location for the actually sent downlink signal is less than or equal to a first preset threshold, it is determined that the random access configuration period is to be adjusted.

Alternatively, based on the foregoing embodiments, before S201, the terminal may further determine a random access resource adjustment manner based on one or more of a downlink/uplink frame format configuration, slot format configuration information, or random access configuration information.

It should be noted that the terminal performs adjustment, and the network device also needs to perform corresponding adjustment, for example, adjust the association relationship between a downlink signal and a random access resource, or adjust the random access configuration period. Details are not described herein again.

Further, before determining, based on the actually available random access resources and the association relationship between a downlink signal and a random access resource, the target random access resource corresponding to the actually sent downlink signal, the terminal may further update the association relationship between a downlink signal and a random access resource based on the actually sent downlink signal(s) and the actually available random access resources, to obtain a new association relationship between a downlink signal and a random access resource.

To be specific, because it is determined that some original random access resources are unavailable, a new actually available random access resource may have been further added, and therefore the association relationship between a downlink signal and a random access resource also needs to be adaptively updated and adjusted.

After the adjustment, the terminal determines, based on the actually available random access resources and an adjusted association relationship between a downlink signal and a random access resource, the target random access resource corresponding to the actually sent downlink signal.

Specifically, a downlink signal and/or a downlink signal group originally associated with a punctured random access resource may be associated with a remaining random access resource in the random access configuration period.

Alternatively, a quantity of random access resources associated with each of actually transmitted downlink signals is updated. An updated quantity of random access resources associated with each of actually transmitted downlink signals is less than the original quantity of random access resources associated with each downlink signal.

Alternatively, a quantity of random access resources associated with a part of actually transmitted downlink signals is updated. After the update, an updated quantity of random access resources associated with this part of actually transmitted downlink signals is less than the original quantity of random access resources associated with this part of actually transmitted downlink signals.

Alternatively, an adjusted random access configuration period remains unchanged, a random access resource is added in the adjusted random access configuration period, and a time location and/or a frequency location of a random access resource associated with each downlink signal or some downlink signals are/is adjusted. In other words, an added actually available random access resource is associated with each actually sent downlink signal or some actually sent downlink signals.

Alternatively, an adjusted random access configuration period becomes longer, and a time location and/or a frequency location of a random access resource associated with each downlink signal or some downlink signals are/is adjusted based on a random access resource in the adjusted random access configuration period.

Alternatively, an adjusted random access configuration period becomes shorter, and a time location and/or a frequency location of a random access resource associated with each downlink signal or some downlink signals are/is adjusted based on a random access resource in the adjusted random access configuration period.

Alternatively, it is determined, based on the adjusted random access configuration period, that a manner of associating a downlink signal and a random access resource is to be changed. Specifically, one-to-one association between an actually sent downlink signal and a random access resource may be changed to association between a plurality of actually sent downlink signals and one random access resource. Alternatively, association between a plurality of actually sent downlink signals and one random access resource may be changed to association between a plurality of actually sent downlink signals and a plurality of random access resources. Alternatively, the association manner may be changed to mapping all actually sent downlink signals to a same random access resource. Alternatively, the association manner may be changed to one-to-one association between some actually sent downlink signals and random access resources, and association between one random access resource and a plurality of actually sent downlink signals in the other part of actually sent downlink signals.

Based on the foregoing embodiments, the time location for the random access resource may overlap with a time location for a semi-persistent scheduling signal.

Among the actually sent downlink signal, the random access resource, and the semi-persistent scheduling signal, the actually sent downlink signal has a highest priority. Once time locations of the actually sent downlink signal, the random access resource, and the semi-persistent scheduling signal overlap, the downlink signal is preferentially sent, and other signals are temporarily not transmitted.

Priorities of the random access resource and the semi-persistent scheduling signal may be configured according to an actual requirement.

Optionally, the terminal determines, based on the time location information for the random access resource and the time location information for the semi-persistent scheduling signal, a random access resource whose time location overlaps with the time location for the semi-persistent scheduling signal.

In a manner, a priority of the random access resource is higher than a priority of the semi-persistent scheduling signal, and the terminal punctures a semi-persistent scheduling signal whose time location overlaps with the time location for the random access resource.

In another manner:

the random access resource whose time location overlaps with the time location for the semi-persistent scheduling signal is punctured; or the random access resource whose time location overlaps with the time location for the semi-persistent scheduling signal, and all random access resources that precede the random access resource whose time location overlaps with the time location for the semi-persistent scheduling signal and that are in a slot in which the random access resource whose time location overlaps with the time location for the semi-persistent scheduling signal is located are punctured; or all random access resources in a slot in which the random access resource whose time location overlaps with the time location for the semi-persistent scheduling signal is located are punctured.

It should be noted that the network device also determines, based on the time location information for the random access resource and time location information for a semi-persistent scheduling signal, a random access resource whose time location overlaps with the time location for the semi-persistent scheduling signal.

Specifically, the network device determines that no random access preamble is to be transmitted on the random access resource whose time location overlaps with the time location for the semi-persistent scheduling signal; or determines that no random access preamble is to be transmitted on the random access resource whose time location overlaps with the time location for the semi-persistent scheduling signal, or any random access resource that precedes the random access resource whose time location overlaps with the time location for the semi-persistent scheduling signal and that is in a slot in which the random access resource whose time location overlaps with the time location for the semi-persistent scheduling signal is located; or determines that no random access preamble is to be transmitted on any random access resource in a slot in which the random access resource whose time location overlaps with the time location for the semi-persistent scheduling signal is located.

Further, it should be noted that a random access preamble format may be one or more of formats in Table 1 in an existing standard: A0, A1, A2, A3, B0, B1, B2, B3, B4, C0, or C2; or may be one or more of formats in Table 2: 0, 1, 2, or 3. In practice, the formats A0 to C2 and the formats 0 to 3 may have other names. This is not limited herein.

Specifically, Table 1 lists a preamble format used when a sequence length L is 127 or 139.

TABLE 1

| Preamble format | Quantity of OFDM symbols | L | $\Delta f^{RA}$ | $N_u$ | $N_{CP}^{RA}$ | $N_{GT}^{RA}$ |
|---|---|---|---|---|---|---|
| A0 | 1 | [127 or 139] | $15 \cdot 2^\mu$ kHz | $2048\kappa \cdot 2^{-\mu}$ | $144\kappa \cdot 2^{-\mu}$ | 0 |
| A1 | 2 | [127 or 139] | $15 \cdot 2^\mu$ kHz | $2 \cdot 2048\kappa \cdot 2^{-\mu}$ | $288\kappa \cdot 2^{-\mu}$ | 0 |
| A2 | 4 | [127 or 139] | $15 \cdot 2^\mu$ kHz | $4 \cdot 2048\kappa \cdot 2^{-\mu}$ | $576\kappa \cdot 2^{-\mu}$ | 0 |
| A3 | 6 | [127 or 139] | $15 \cdot 2^\mu$ kHz | $6 \cdot 2048\kappa \cdot 2^{-\mu}$ | $864\kappa \cdot 2^{-\mu}$ | 0 |
| B1 | 2 | [127 or 139] | $15 \cdot 2^\mu$ kHz | $2 \cdot 2048\kappa \cdot 2^{-\mu}$ | $216\kappa \cdot 2^{-\mu}$ | $72\kappa \cdot 2^\mu$ |
| B2 | 4 | [127 or 139] | $15 \cdot 2^\mu$ kHz | $4 \cdot 2048\kappa \cdot 2^{-\mu}$ | $360\kappa \cdot 2^{-\mu}$ | $72\kappa \cdot 2^\mu$ |
| B3 | 6 | [127 or 139] | $15 \cdot 2^\mu$ kHz | $6 \cdot 2048\kappa \cdot 2^{-\mu}$ | $504\kappa \cdot 2^{-\mu}$ | $360\kappa \cdot 2^\mu$ |
| B4 | 12 | [127 or 139] | $15 \cdot 2^\mu$ kHz | $12 \cdot 2048\kappa \cdot 2^{-\mu}$ | $936\kappa \cdot 2^{-\mu}$ | $792\kappa \cdot 2^\mu$ |
| C0 | 1 | [127 or 139] | $15 \cdot 2^\mu$ kHz | $2048\kappa \cdot 2^{-\mu}$ | $1240\kappa \cdot 2^{-\mu}$ | $1096\kappa \cdot 2^\mu$ |
| C2 | 4 | [127 or 139] | $15 \cdot 2^\mu$ kHz | $4 \cdot 2048\kappa \cdot 2^{-\mu}$ | $2048\kappa \cdot 2^{-\mu}$ | $2916\kappa \cdot 2^\mu$ |

Table 2 lists a preamble format used when a sequence length L is 839.

TABLE 2

| Preamble format | L | $\Delta f^{RA}$ | $N_u$ | $N_{CP}^{RA}$ | $N_{GT}^{RA}$ |
|---|---|---|---|---|---|
| 0 | 839 | 1.25 kHz | $2457\kappa$ | $3168\kappa$ | $2976\kappa \cdot 2^\mu$ |
| 1 | 839 | 1.25 kHz | $2.24576\kappa$ | $21024\kappa$ | $21904\kappa \cdot 2^\mu$ |
| 2 | 839 | 1.25 kHz | $4.24576\kappa$ | $4688\kappa$ | $4528\kappa \cdot 2^\mu$ |
| 3 | 839 | 5 kHz | $2457\kappa$ | $3168\kappa$ | $2796\kappa \cdot 2^\mu$ |

$\kappa = 64$. $\Delta f^{RA}$ indicates a random access preamble subcarrier spacing. $N_u$ indicates a length of a random access preamble sequence. $N_{CP}^{RA}$ indicates a cyclic prefix (cyclic prefix, CP) length of a random access preamble. $N_{GT}^{RA}$ indicates a guard period.

Based on the foregoing embodiments, the terminal may determine a quantity of punctured random access resources based on the random access preamble format and a quantity of overlapping OFDM symbols that are between the actually sent downlink signal and the random access resource and that are in the slot in which the random access resource is located.

When there are two consecutive overlapping OFDM symbols between the actually sent downlink signal and the random access resource in the slot in which the random access resource is located, refer to Table 3.

TABLE 3

| Format | Quantity |
|---|---|
| A0 | 1 |
| A0 | 2 |
| A1 | 1 |
| B1 | 1 |
| C1 | 1 |

It can be learned that, when there are two consecutive overlapping OFDM symbols between the actually sent downlink signal and the random access resource in the slot in which the random access resource is located, if the random access preamble format is A0, it is determined that the quantity of punctured random access resources is one or two OFDM symbols; if the random access preamble format is A1, it is determined that the quantity of punctured random access resources is one OFDM symbol; if the random access preamble format is B1, it is determined that the quantity of punctured random access resources is one OFDM symbol; or if the random access preamble format is C1, it is determined that the quantity of punctured random access resources is one OFDM symbol.

When there are three consecutive overlapping OFDM symbols between the actually sent downlink signal and the random access resource in the slot in which the random access resource is located, refer to Table 4.

TABLE 4

| Format | Quantity |
|---|---|
| A0 | 1 |
| A0 | 2 |
| A0 | 3 |
| A1 | 1 |
| B1 | 1 |
| C1 | 1 |

It can be learned that, when there are three consecutive overlapping OFDM symbols between the actually sent downlink signal and the random access resource in the slot in which the random access resource is located, if the random access preamble format is A0, it is determined that the quantity of punctured random access resources is one, two, or three OFDM symbols; and so on. Details are not described again.

When there are four consecutive overlapping OFDM symbols between the actually sent downlink signal and the random access resource in the slot in which the random access resource is located, refer to Table 5.

TABLE 5

| Format | Quantity |
|---|---|
| A0 | 1 |
| A0 | 2 |
| A0 | 3 |
| A0 | 4 |
| A1 | 3 |
| A1 | 2 |
| A2 | 1 |
| B1 | 1 |
| B1 | 2 |
| B2 | 1 |
| C1 | 1 |
| C1 | 2 |

It can be learned that, when there are four consecutive overlapping OFDM symbols between the actually sent downlink signal and the random access resource in the slot in which the random access resource is located, if the random access preamble format is A0, it is determined that the quantity of punctured random access resources is one, two, three, or four OFDM symbols; and so on. Details are not described again.

When there are five consecutive overlapping OFDM symbols between the actually sent downlink signal and the random access resource in the slot in which the random access resource is located, refer to Table 6.

TABLE 6

| Format | Quantity |
|---|---|
| A0 | 1 |
| A0 | 2 |
| A0 | 3 |
| A0 | 4 |
| A0 | 5 |
| A1 | 1 |
| A1 | 2 |
| A2 | 1 |
| B1 | 1 |
| B1 | 2 |
| B2 | 1 |
| C1 | 1 |
| C1 | 2 |
| C1 | 3 |

It can be learned that, when there are five consecutive overlapping OFDM symbols between the actually sent downlink signal and the random access resource in the slot in which the random access resource is located, if the random access preamble format is A0, it is determined that the quantity of punctured random access resources is one, two, three, four, or five OFDM symbols; and so on. Details are not described again.

When there are six consecutive overlapping OFDM symbols between the actually sent downlink signal and the random access resource in the slot in which the random access resource is located, refer to Table 7.

TABLE 7

| Format | Quantity |
|---|---|
| A0 | 1 |
| A0 | 2 |
| A0 | 3 |
| A0 | 4 |

TABLE 7-continued

| Format | Quantity |
|---|---|
| A0 | 5 |
| A0 | 6 |
| A1 | 1 |
| A1 | 2 |
| A1 | 3 |
| A2 | 1 |
| A3 | 1 |
| B1 | 1 |
| B1 | 2 |
| B1 | 3 |
| B2 | 1 |
| B3 | 1 |
| C1 | 1 |
| C1 | 2 |
| C1 | 3 |

It can be learned that, when there are six consecutive overlapping OFDM symbols between the actually sent downlink signal and the random access resource in the slot in which the random access resource is located, if the random access preamble format is A0, it is determined that the quantity of punctured random access resources is one, two, three, four, five, or six OFDM symbols; and so on. Details are not described again.

When there are seven consecutive overlapping OFDM symbols between the actually sent downlink signal and the random access resource in the slot in which the random access resource is located, refer to Table 8.

TABLE 8

| Format | Quantity |
|---|---|
| A0 | 1 |
| A0 | 2 |
| A0 | 3 |
| A0 | 4 |
| A0 | 5 |
| A0 | 6 |
| A0 | 7 |
| A1 | 1 |
| A1 | 2 |
| A1 | 3 |
| A2 | 1 |
| A3 | 1 |
| B1 | 1 |
| B1 | 2 |
| B1 | 3 |
| B2 | 1 |
| B3 | 1 |
| C1 | 1 |
| C1 | 2 |
| C1 | 3 |
| C1 | 4 |
| C2 | 1 |

It can be learned that, when there are seven consecutive overlapping OFDM symbols between the actually sent downlink signal and the random access resource in the slot in which the random access resource is located, if the random access preamble format is A0, it is determined that the quantity of punctured random access resources is one, two, three, four, five, six, or seven OFDM symbols; and so on. Details are not described again.

When there are eight consecutive overlapping OFDM symbols between the actually sent downlink signal and the random access resource in the slot in which the random access resource is located, refer to Table 9.

TABLE 9

| Format | Quantity |
|---|---|
| A0 | 1 |
| A0 | 2 |
| A0 | 3 |
| A0 | 4 |
| A0 | 5 |
| A0 | 6 |
| A0 | 7 |
| A0 | 8 |
| A1 | 1 |
| A1 | 2 |
| A1 | 3 |
| A1 | 4 |
| A2 | 1 |
| A2 | 2 |
| A3 | 1 |
| B1 | 1 |
| B1 | 2 |
| B1 | 3 |
| B1 | 4 |
| B2 | 1 |
| B2 | 2 |
| B3 | 1 |
| C1 | 1 |
| C1 | 2 |
| C1 | 3 |
| C1 | 4 |
| C1 | 5 |
| C2 | 1 |

It can be learned that, when there are eight consecutive overlapping OFDM symbols between the actually sent downlink signal and the random access resource in the slot in which the random access resource is located, if the random access preamble format is A0, it is determined that the quantity of punctured random access resources is one, two, three, four, five, six, seven, or eight OFDM symbols; and so on. Details are not described again.

When there are nine consecutive overlapping OFDM symbols between the actually sent downlink signal and the random access resource in the slot in which the random access resource is located, refer to Table 10.

TABLE 10

| Format | Quantity |
|---|---|
| A0 | 1 |
| A0 | 2 |
| A0 | 3 |
| A0 | 4 |
| A0 | 5 |
| A0 | 6 |
| A0 | 7 |
| A0 | 8 |
| A0 | 9 |
| A1 | 1 |
| A1 | 2 |
| A1 | 3 |
| A1 | 4 |
| A2 | 1 |
| A2 | 2 |
| A3 | 1 |
| B1 | 1 |
| B1 | 2 |
| B1 | 3 |
| B1 | 4 |
| B2 | 1 |
| B2 | 2 |
| B3 | 1 |
| C1 | 1 |
| C1 | 2 |
| C1 | 3 |

TABLE 10-continued

| Format | Quantity |
|---|---|
| C1 | 4 |
| C1 | 5 |
| C2 | 1 |

It can be learned that, when there are nine consecutive overlapping OFDM symbols between the actually sent downlink signal and the random access resource in the slot in which the random access resource is located, if the random access preamble format is A0, it is determined that the quantity of punctured random access resources is one, two, three, four, five, six, seven, eight, or nine OFDM symbols; and so on. Details are not described again.

When there are 10 consecutive overlapping OFDM symbols between the actually sent downlink signal and the random access resource in the slot in which the random access resource is located, refer to Table 11.

TABLE 11

| Format | Quantity |
|---|---|
| A0 | 1 |
| A0 | 2 |
| A0 | 3 |
| A0 | 4 |
| A0 | 5 |
| A0 | 6 |
| A0 | 7 |
| A0 | 8 |
| A0 | 9 |
| A0 | 10 |
| A1 | 1 |
| A1 | 2 |
| A1 | 3 |
| A1 | 4 |
| A1 | 5 |
| A2 | 1 |
| A2 | 2 |
| A3 | 1 |
| B1 | 1 |
| B1 | 2 |
| B1 | 3 |
| B1 | 4 |
| B1 | 5 |
| B2 | 1 |
| B2 | 2 |
| B3 | 1 |
| C1 | 1 |
| C1 | 2 |
| C1 | 3 |
| C1 | 4 |
| C1 | 5 |
| C1 | 6 |
| C2 | 1 |

It can be learned that, when there are 10 consecutive overlapping OFDM symbols between the actually sent downlink signal and the random access resource in the slot in which the random access resource is located, if the random access preamble format is A0, it is determined that the quantity of punctured random access resources is 1, 2, 3, 4, 5, 6, 7, 8, 9, or 10 OFDM symbols; and so on. Details are not described again.

When there are 11 consecutive overlapping OFDM symbols between the actually sent downlink signal and the random access resource in the slot in which the random access resource is located, refer to Table 12.

TABLE 12

| Format | Quantity |
|---|---|
| A0 | 1 |
| A0 | 2 |
| A0 | 3 |
| A0 | 4 |
| A0 | 5 |
| A0 | 6 |
| A0 | 7 |
| A0 | 8 |
| A0 | 9 |
| A0 | 10 |
| A0 | 11 |
| A1 | 1 |
| A1 | 2 |
| A1 | 3 |
| A1 | 4 |
| A1 | 5 |
| A2 | 1 |
| A2 | 2 |
| A3 | 1 |
| B1 | 1 |
| B1 | 2 |
| B1 | 3 |
| B1 | 4 |
| B1 | 5 |
| B2 | 1 |
| B2 | 2 |
| B3 | 1 |
| C1 | 1 |
| C1 | 2 |
| C1 | 3 |
| C1 | 4 |
| C1 | 5 |
| C1 | 6 |
| C1 | 7 |
| C2 | 1 |
| C2 | 2 |

It can be learned that, when there are 11 consecutive overlapping OFDM symbols between the actually sent downlink signal and the random access resource in the slot in which the random access resource is located, if the random access preamble format is A0, it is determined that the quantity of punctured random access resources is 1, 2, 3, 4, 5, 6, 7, 8, 9, 10, or 11 OFDM symbols; and so on. Details are not described again.

When there are 12 consecutive overlapping OFDM symbols between the actually sent downlink signal and the random access resource in the slot in which the random access resource is located, refer to Table 13.

TABLE 13

| Format | Quantity |
|---|---|
| A0 | 1 |
| A0 | 2 |
| A0 | 3 |
| A0 | 4 |
| A0 | 5 |
| A0 | 6 |
| A0 | 7 |
| A0 | 8 |
| A0 | 9 |
| A0 | 10 |
| A0 | 11 |
| A0 | 12 |
| A1 | 1 |
| A1 | 2 |
| A1 | 3 |
| A1 | 4 |
| A1 | 5 |
| A1 | 6 |
| A2 | 1 |
| A2 | 2 |
| A2 | 3 |
| A3 | 1 |
| A3 | 2 |
| B1 | 1 |
| B1 | 1 |
| B1 | 2 |
| B1 | 3 |
| B1 | 4 |
| B1 | 5 |
| B1 | 6 |
| B2 | 1 |
| B2 | 2 |
| B2 | 3 |
| B3 | 1 |
| B3 | 2 |
| C1 | 1 |
| C1 | 2 |
| C1 | 3 |
| C1 | 4 |
| C1 | 5 |
| C1 | 6 |
| C1 | 7 |
| C2 | 1 |
| C2 | 2 |

It can be learned that, when there are 12 consecutive overlapping OFDM symbols between the actually sent downlink signal and the random access resource in the slot in which the random access resource is located, if the random access preamble format is A0, it is determined that the quantity of punctured random access resources is 1, 2, 3, 4, 5, 6, 7, 8, 9, 10, 11, or 12 OFDM symbols; and so on. Details are not described again.

When there are 13 consecutive overlapping OFDM symbols between the actually sent downlink signal and the random access resource in the slot in which the random access resource is located, refer to Table 14.

TABLE 14

| Format | Quantity |
|---|---|
| A0 | 1 |
| A0 | 2 |
| A0 | 3 |
| A0 | 4 |
| A0 | 5 |
| A0 | 6 |
| A0 | 7 |
| A0 | 8 |
| A0 | 9 |
| A0 | 10 |
| A0 | 11 |
| A0 | 12 |
| A0 | 13 |
| A1 | 1 |
| A1 | 2 |
| A1 | 3 |
| A1 | 4 |
| A1 | 5 |
| A1 | 6 |
| A2 | 1 |
| A2 | 2 |
| A2 | 3 |
| A3 | 1 |
| A3 | 2 |
| B1 | 1 |
| B1 | 1 |
| B1 | 2 |
| B1 | 3 |
| B1 | 4 |
| B1 | 5 |
| B1 | 6 |
| B2 | 1 |

TABLE 14-continued

| Format | Quantity |
| --- | --- |
| B2 | 2 |
| B2 | 3 |
| B3 | 1 |
| B3 | 2 |
| C1 | 1 |
| C1 | 2 |
| C1 | 3 |
| C1 | 4 |
| C1 | 5 |
| C1 | 6 |
| C1 | 7 |
| C1 | 8 |
| C2 | 1 |
| C2 | 2 |

It can be learned that, when there are 13 consecutive overlapping OFDM symbols between the actually sent downlink signal and the random access resource in the slot in which the random access resource is located, if the random access preamble format is A0, it is determined that the quantity of punctured random access resources is 1, 2, 3, 4, 5, 6, 7, 8, 9, 10, 11, 12, or 13 OFDM symbols; and so on. Details are not described again.

It should be understood that, when a random access resource is added, a quantity of added random access preambles is related to duration, corresponding to a time scale of a random access preamble, of an available uplink subframe, slot, or OFDM symbol. For example, a quantity of added random access preambles in time is determined based on Table 1 to Table 12, and the quantity of added random access preambles cannot exceed a maximum quantity allowed in a corresponding table.

FIG. 16(a) to FIG. 16(g) are schematic diagrams of random access preamble formats according to this application. Details are as follows.

Figure 16A:
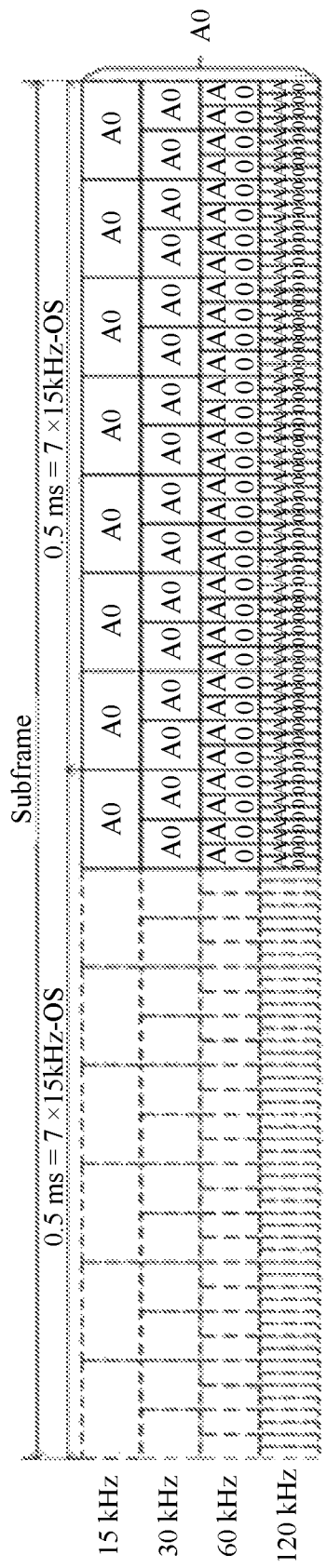
FIG. 16(a) to FIG. 16(g) are schematic diagrams of random access preamble formats according to this application.

In FIG. 16(a), N random access preamble formats A0 are continuously distributed in a subframe (subframe). At a corresponding subcarrier spacing, total duration of the N random access preamble formats A0 does not exceed one subframe. In another implementation, total duration of the N random access preamble formats A0 does not exceed K slots. K and N are positive integers.

Figure 16B:
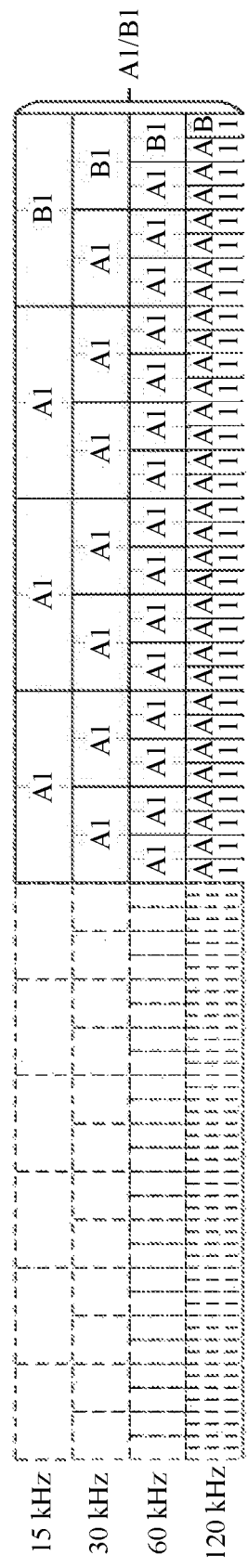

In FIG. 16(b), N random access preamble formats A1/B1 are continuously distributed in a subframe. At a corresponding subcarrier spacing, total duration of the N random access preamble formats A1/B1 does not exceed one subframe. In another implementation, total duration of the N random access preamble formats A1/B1 does not exceed K slots. K and N are positive integers.

Figure 16C:
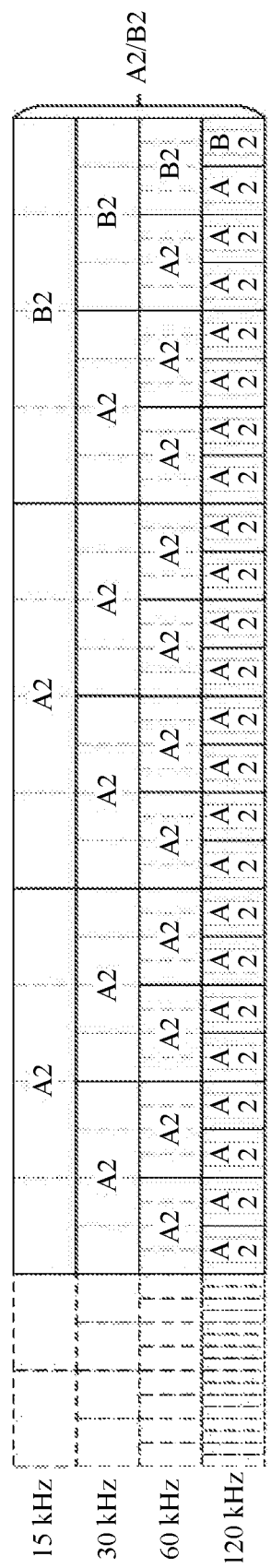

In FIG. 16(c), N random access preamble formats A2/B2 are continuously distributed in a subframe. At a corresponding subcarrier spacing, total duration of the N random access preamble formats A2/B2 does not exceed one subframe. In another implementation, total duration of the N random access preamble formats A2/B2 does not exceed K slots. K and N are positive integers.

Figure 16D:
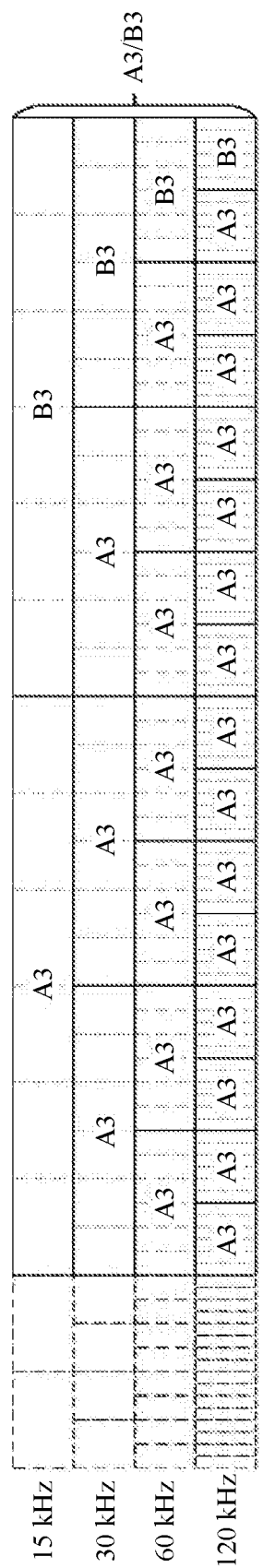

In FIG. 16(d), N random access preamble formats A3/B3 are continuously distributed in a subframe. At a corresponding subcarrier spacing, total duration of the N random access preamble formats A3/B3 does not exceed one subframe. In another implementation, total duration of the N random access preamble formats A3/B3 does not exceed K slots. K and N are positive integers.

Figure 16E:
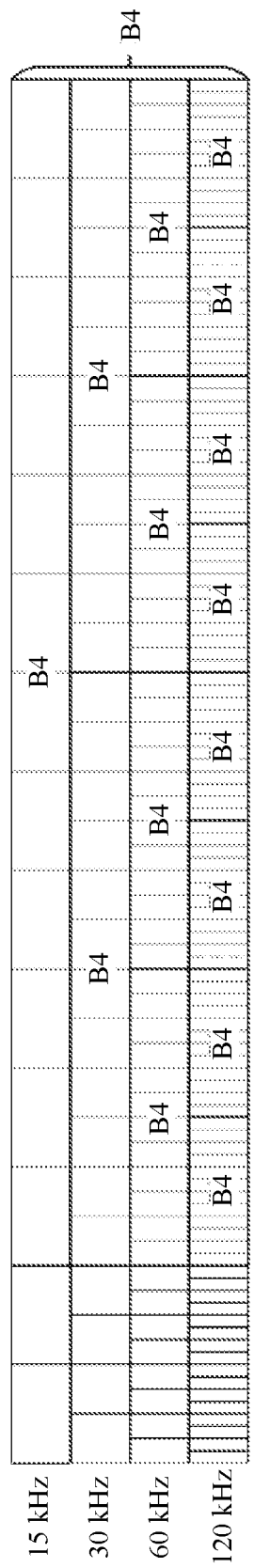

In FIG. 16(e), N random access preamble formats B4 are continuously distributed in a subframe. At a corresponding subcarrier spacing, total duration of the N random access preamble formats B4 does not exceed one subframe. In another implementation, total duration of the N random access preamble formats B4 does not exceed K slots. K and N are positive integers.

Figure 16F:
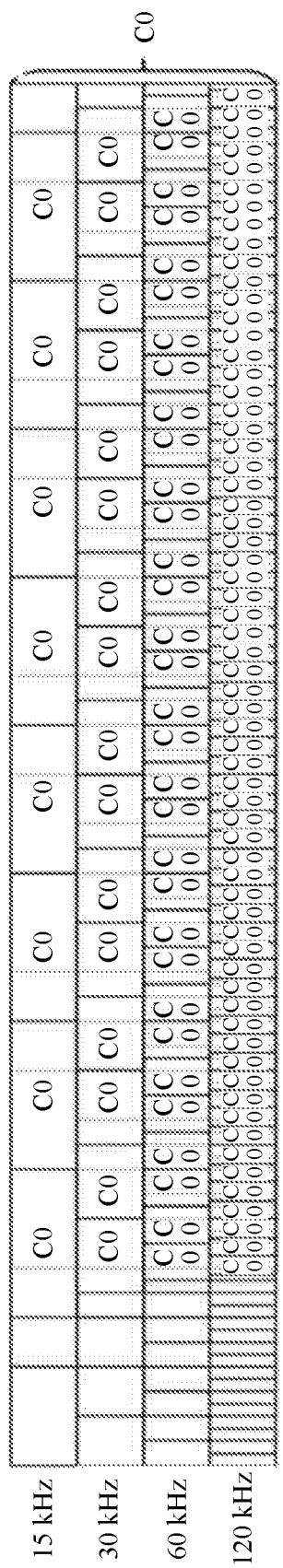

In FIG. 16(f), N random access preamble formats C0 are continuously distributed in a subframe. At a corresponding subcarrier spacing, total duration of the N random access preamble formats C0 does not exceed one subframe. In another implementation, total duration of the N random access preamble formats C0 does not exceed K slots. K and N are positive integers.

Figure 16G:
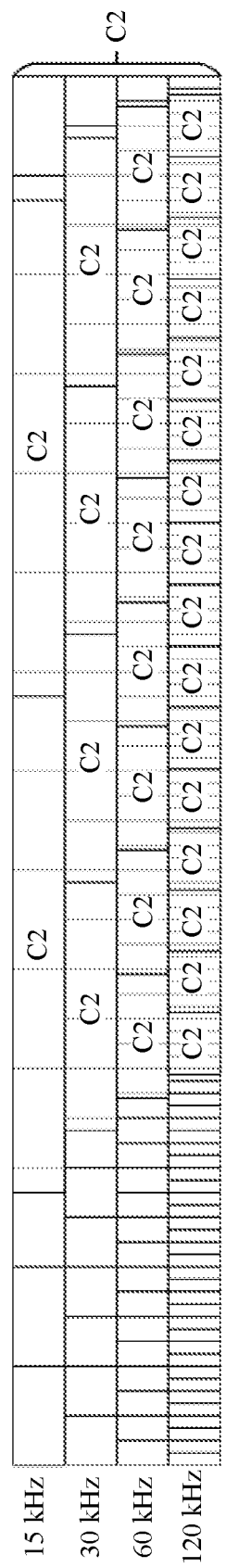

In FIG. 16(g), N random access preamble formats C2 are continuously distributed in a subframe. At a corresponding subcarrier spacing, total duration of the N random access preamble formats C2 does not exceed one subframe. In another implementation, total duration of the N random access preamble formats C2 does not exceed K slots. K and N are positive integers.

FIG. 17(a) to FIG. 17(g) are schematic diagrams of random access preamble formats according to this application. Details are as follows.

Figure 17A:
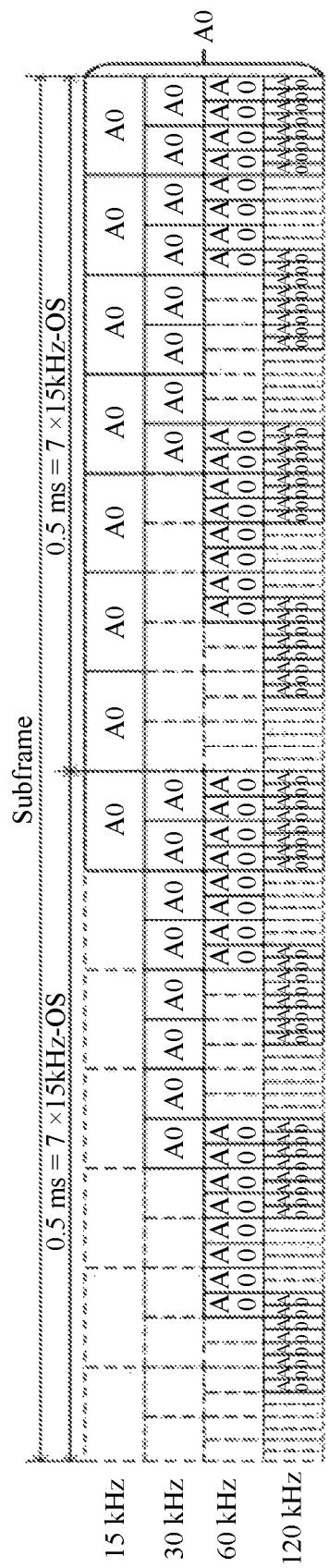
FIG. 17(a) to FIG. 17(g) are schematic diagrams of random access preamble formats according to this application.

In FIG. 17(a), N random access preamble formats A0 are continuously distributed in a slot. At a corresponding subcarrier spacing, total duration of the N random access preamble formats A0 does not exceed one slot. N is a positive integer.

Figure 17B:
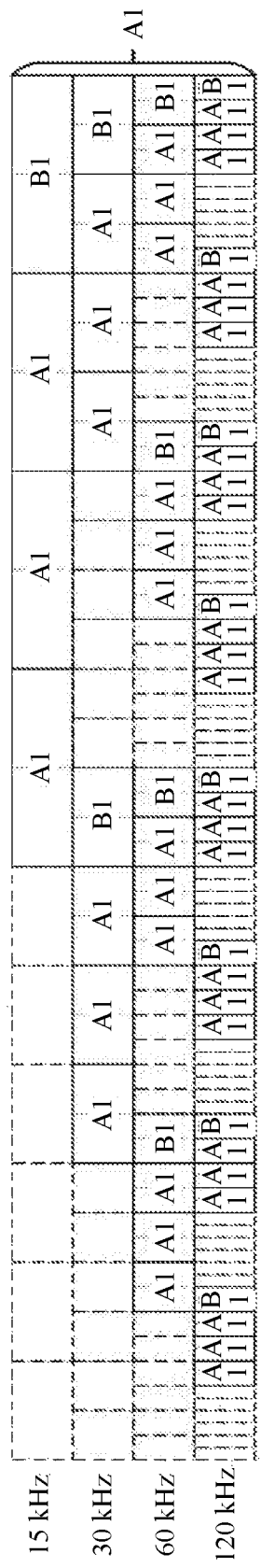

In FIG. 17(b), N random access preamble formats A1/B1 are continuously distributed in a slot. At a corresponding subcarrier spacing, total duration of the N random access preamble formats A1/B1 does not exceed one slot. N is a positive integer.

Figure 17C:
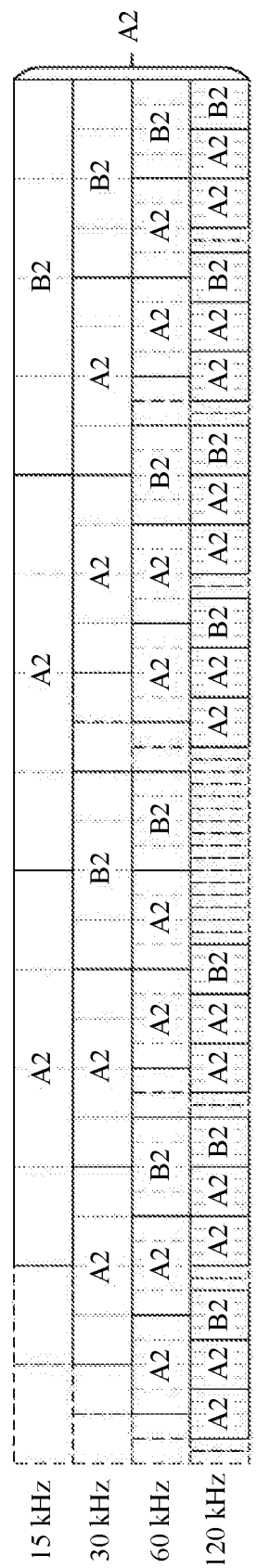

In FIG. 17(c), N random access preamble formats A2/B2 are continuously distributed in a slot. At a corresponding subcarrier spacing, total duration of the N random access preamble formats A2/B2 does not exceed one slot. N is a positive integer.

Figure 17D:
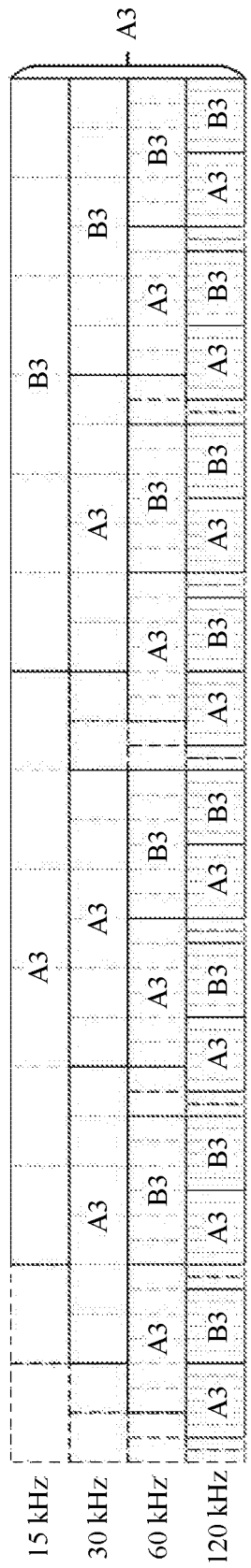

In FIG. 17(d), N random access preamble formats A3/B3 are continuously distributed in a slot. At a corresponding subcarrier spacing, total duration of the N random access preamble formats A3/B3 does not exceed one slot. N is a positive integer.

Figure 17E:
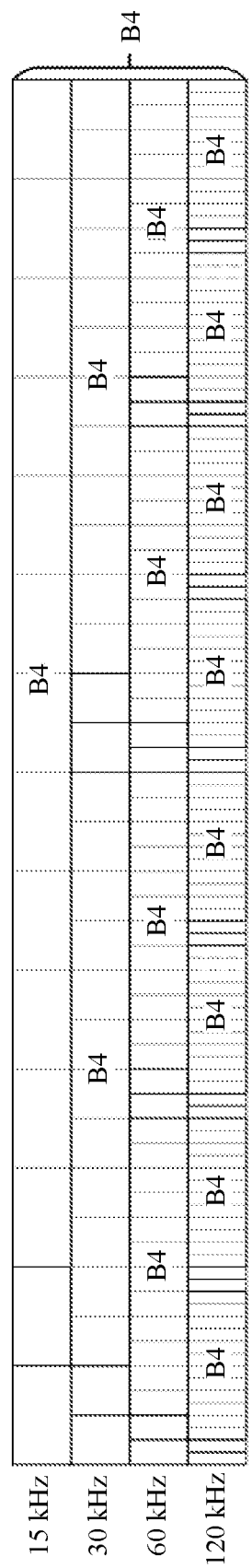

In FIG. 17(e), N random access preamble formats B4 are continuously distributed in a slot. At a corresponding subcarrier spacing, total duration of the N random access preamble formats B4 does not exceed one slot. N is a positive integer.

Figure 17F:
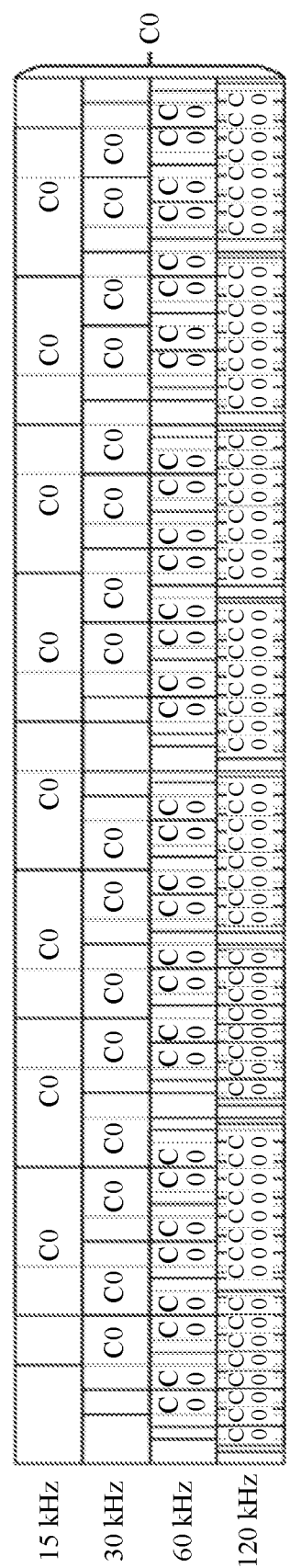

In FIG. 17(f), N random access preamble formats C0 are continuously distributed in a slot. At a corresponding subcarrier spacing, total duration of the N random access preamble formats C0 does not exceed one slot; or total duration of the N random access preamble formats C0 does not exceed K slots, where K is a positive integer. K and N are positive integers.

Figure 17G:
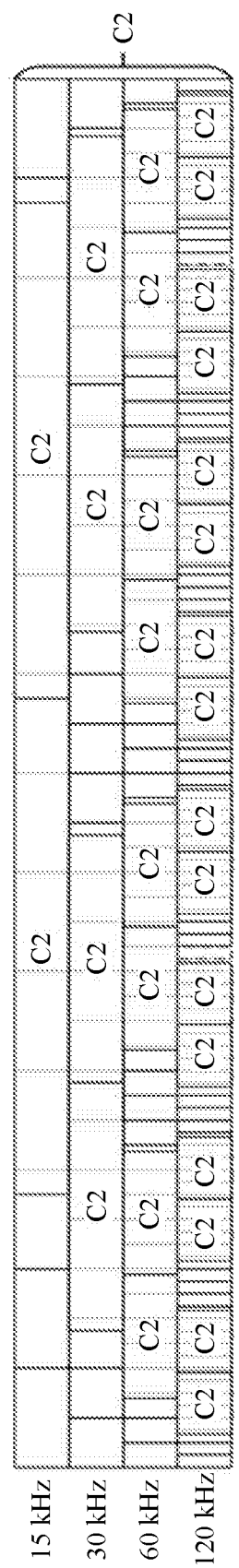

In FIG. 17(g), N random access preamble formats C2 are continuously distributed in a slot. At a corresponding subcarrier spacing, total duration of the N random access preamble formats C2 does not exceed one slot. K and N are positive integers.

It should be noted that two random access resource patterns in FIG. 16(a) to FIG. 16(g) and in FIG. 17(a) to FIG. 17(g) may be indicated by configuration information of a base station, or may be preconfigured. For example, the manner shown in FIG. 16(a) to FIG. 16(g) is fixedly used. For another example, the manner shown in FIG. 17(a) to FIG. 17(g) is fixedly used. When the manner is indicated by the network device, one bit may be used to indicate a Flag.

When the Flag is 0, the manner shown in FIG. 16(a) to FIG. 16(g) is indicated; or when the Flag is 1, the manner shown in FIG. 17(a) to FIG. 17(g) is indicated. Alternatively, when the Flag is 1, the manner shown in FIG. 16(a) to FIG. 16(g) is indicated; or when the Flag is 0, the manner shown in FIG. 17(a) to FIG. 17(g) is indicated.

Figure 18:
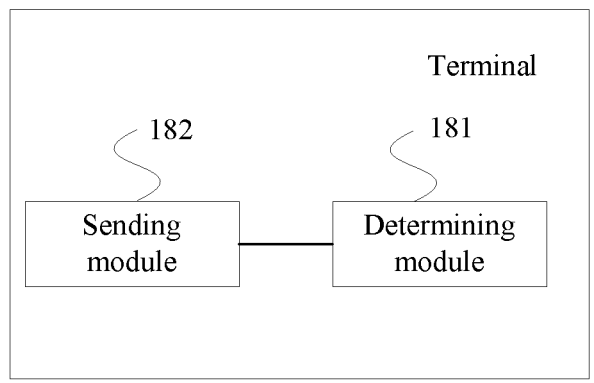
FIG. 18 is a schematic structural diagram of a terminal according to an embodiment of this application.

FIG. 18 is a schematic structural diagram of a terminal according to an embodiment of this application. As shown in FIG. 18, the terminal includes a determining module 181 and a sending module 182.

The determining module 181 is configured to: determine an actually available random access resource based on time location information for a random access resource and time location information for a downlink signal actually sent by a network device, where a time location for the actually available random access resource does not overlap with the time location for the actually sent downlink signal; and determine, based on the actually available random access resource and an association relationship between a downlink signal and a random access resource, a target random access resource corresponding to the actually sent downlink signal.

The sending module 182 is configured to send a random access preamble to the network device by using the target random access resource.

Optionally, the determining module 181 is specifically configured to: determine, based on the time location information for the random access resource and the time location information for the downlink signal actually sent by the network device, a random access resource whose time location overlaps with the time location for the actually sent downlink signal; and determine to use, as the actually available random access resource, a random access resource whose time location does not overlap with the time location for the actually sent downlink signal.

Optionally, the determining module 181 is further configured to: determine to puncture the random access resource whose time location overlaps with the time location for the actually sent downlink signal; or determine to puncture the random access resource whose time location overlaps with the time location for the actually sent downlink signal, and all random access resources that precede the random access resource whose time location overlaps with the time location for the actually sent downlink signal and that are in a slot in which the random access resource whose time location overlaps with the time location for the actually sent downlink signal is located; or determine to puncture all random access resources in a slot in which the random access resource whose time location overlaps with the time location for the actually sent downlink signal is located.

In an embodiment, the downlink signal is one or more of the following: a downlink synchronization signal block, a system information block, remaining minimum system information, a new radio system information block 1 NR SIB1, a new radio system information block 0 NR SIB0, a semi-statically configured downlink subframe, a semi-statically configured slot, a semi-statically configured OFDM symbol, or a reserved downlink signal.

In another embodiment, the time location for the downlink signal is determined based on one or more of the following: a slot occupied by the downlink signal, an OFDM symbol occupied by the downlink signal, or a downlink/uplink guard period, where the slot is based on a subcarrier spacing of the downlink signal, and the downlink/uplink guard period is a period of time.

This embodiment of the present invention and the foregoing method embodiments are based on a same idea and bring a same technical effect. For a specific process, refer to the descriptions of the method embodiments. Details are not described herein again.

Figure 19:
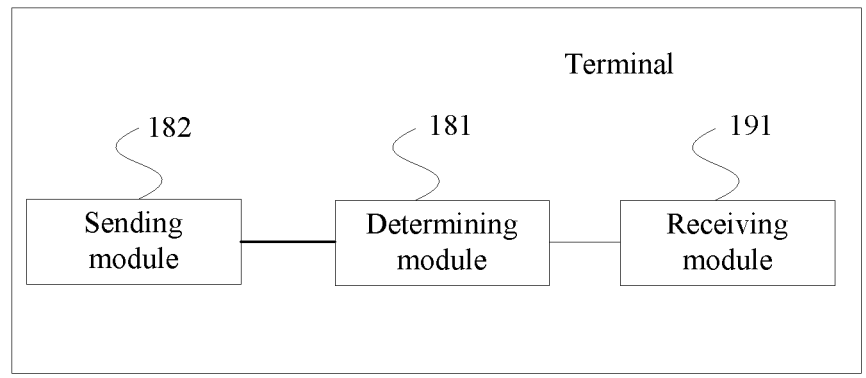
FIG. 19 is a schematic structural diagram of a terminal according to another embodiment of this application.

FIG. 19 is a schematic structural diagram of a terminal according to another embodiment of this application. As shown in FIG. 19, based on FIG. 18, the terminal further includes a receiving module 191, configured to receive configuration information sent by the network device. The configuration information indicates one or more of the following: the slot in which the random access resource is located is based on a subcarrier spacing of a random access message 1, the slot in which the random access resource is located is based on a subcarrier spacing of a random access message 3, the slot in which the random access resource is located is based on a subcarrier spacing of uplink initial access bandwidth, the slot in which the random access resource is located is based on a subcarrier spacing of a downlink signal, or a length of the slot in which the random access resource is located.

Further, the determining module 181 is further configured to: determine, based on the time location information for the random access resource and time location information for a semi-persistent scheduling signal, a semi-persistent scheduling signal whose time location overlaps with the time location for the random access resource; and determine to puncture the semi-persistent scheduling signal whose time location overlaps with the time location for the random access resource.

Further, the determining module 181 is further configured to: determine, based on the time location information for the random access resource and time location information for a semi-persistent scheduling signal, a random access resource whose time location overlaps with the time location for the semi-persistent scheduling signal; and determine to puncture the random access resource whose time location overlaps with the time location for the semi-persistent scheduling signal; or determine to puncture the random access resource whose time location overlaps with the time location for the semi-persistent scheduling signal, and all random access resources that precede the random access resource whose time location overlaps with the time location for the semi-persistent scheduling signal and that are in a slot in which the random access resource whose time location overlaps with the time location for the semi-persistent scheduling signal is located; or determine to puncture all random access resources in a slot in which the random access resource whose time location overlaps with the time location for the semi-persistent scheduling signal is located.

In addition, the determining module 181 is further configured to: determine to add a new random access resource in a $K^{th}$ uplink slot before or after an uplink slot in which a punctured random access resource is located, and to use the new random access resource as an actually available random access resource, where K is a preset or preconfigured constant; or determine to add a new random access resource in a frequency-domain location of an uplink slot in which the random access resource whose location does not overlap with the location of the actually sent downlink signal is located, and to use the new random access resource as an actually available random access resource; or determine to add a new random access resource in another orthogonal frequency division multiplexing OFDM symbol of an uplink slot in which the random access resource whose location does not overlap with the location of the actually sent downlink signal is located, and to use the new random access resource as an actually available random access resource.

Optionally, in an implementation, the determining module 181 is further configured to determine a quantity of punctured random access resources based on a random access preamble format and a quantity of overlapping OFDM symbols that are between the actually sent downlink signal and the random access resource and that are in the slot in which the random access resource is located.

In another implementation, the determining module 181 is further configured to determine to update the association relationship between a downlink signal and a random access resource based on the actually sent downlink signal and the actually available random access resources, to obtain a new association relationship between a downlink signal and a random access resource.

This embodiment of the present invention and the foregoing method embodiments are based on a same idea and bring a same technical effect. For a specific process, refer to the descriptions of the method embodiments. Details are not described herein again.

Figure 20:
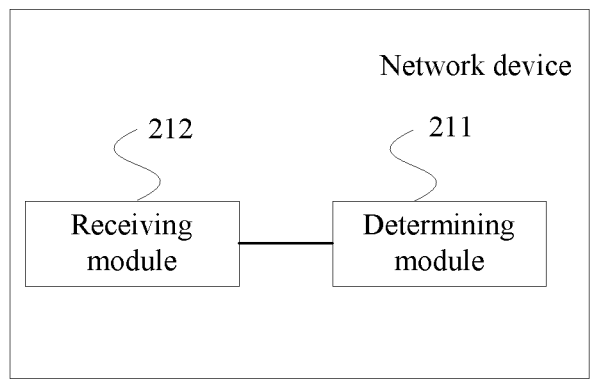
FIG. 20 is a schematic structural diagram of a network device according to an embodiment of this application.

FIG. 20 is a schematic structural diagram of a network device according to an embodiment of this application. As shown in FIG. 20, the network device includes a determining module 211 and a receiving module 212.

The determining module 211 is configured to: determine an actually available random access resource based on time location information for a random access resource and time location information for a downlink signal actually sent by the network device, where a time location for the actually available random access resource does not overlap with the time location for the actually sent downlink signal; and determine, based on the actually available random access resources and an association relationship between a downlink signal and a random access resource, a target random access resource corresponding to the actually sent downlink signal.

The receiving module 212 is configured to receive, based on the target random access resource corresponding to the actually sent downlink signal, a random access preamble sent by a terminal.

Optionally, the determining module 211 is specifically configured to: determine, based on the time location information for the random access resource and the time location information for the downlink signal actually sent by the network device, a random access resource whose time location overlaps with the time location for the actually sent downlink signal; and determine to use, as the actually available random access resource, a random access resource whose time location does not overlap with the time location for the actually sent downlink signal.

Optionally, the downlink signal is one or more of the following: a downlink synchronization signal block, a system information block, remaining minimum system information, a new radio system information block 1 NR SIB1, a new radio system information block 0 NR SIB0, a semi-statically configured downlink subframe, a semi-statically configured slot, a semi-statically configured OFDM symbol, or a reserved downlink signal.

This embodiment of the present invention and the foregoing method embodiments are based on a same idea and bring a same technical effect. For a specific process, refer to the descriptions of the method embodiments. Details are not described herein again.

Figure 21:
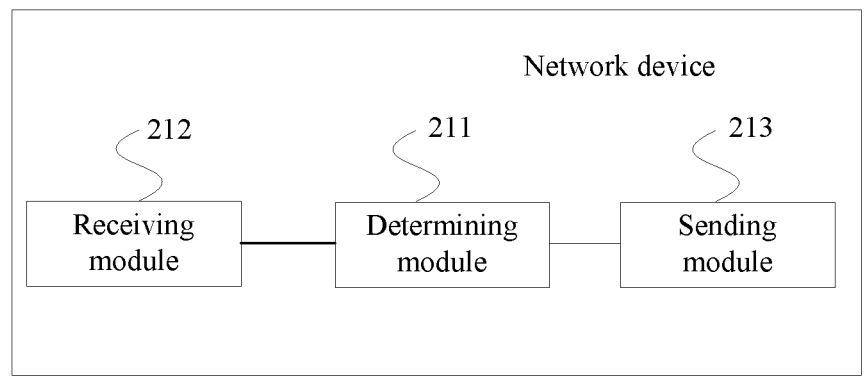
FIG. 21 is a schematic structural diagram of a network device according to another embodiment of this application.

FIG. 21 is a schematic structural diagram of a network device according to another embodiment of this application. As shown in FIG. 21, based on FIG. 20, the network device further includes a sending module 213, configured to send configuration information to the terminal. The configuration information indicates one or more of the following: a slot in which the random access resource is located is based on a subcarrier spacing of a random access message 1, a slot in which the random access resource is located is based on a subcarrier spacing of a random access message 3, a slot in which the random access resource is located is based on a subcarrier spacing of uplink initial access bandwidth, a slot in which the random access resource is located is based on a subcarrier spacing of a downlink signal, or a length of a slot in which the random access resource is located.

Optionally, the time location for the downlink signal is determined based on one or more of the following: a slot occupied by the downlink signal, an OFDM symbol occupied by the downlink signal, or a downlink/uplink guard period, where the slot is based on a subcarrier spacing of the downlink signal, and the downlink/uplink guard period is a period of time.

Optionally, the determining module 211 is further configured to determine to update the association relationship between a downlink signal and a random access resource based on the actually sent downlink signal(s) and the actually available random access resource, to obtain a new association relationship between a downlink signal and a random access resource.

This embodiment of the present invention and the foregoing method embodiments are based on a same idea and bring a same technical effect. For a specific process, refer to the descriptions of the method embodiments. Details are not described herein again.

It should be noted that the module division of the apparatuses is merely logical function division. In actual implementation, all or some of the modules may be integrated into one physical entity, or may be physically separated. In addition, all of the modules may be implemented by a processing element invoking software; or all of the modules may be implemented by hardware; or some of the modules may be implemented by a processing element invoking software, and some of the modules may be implemented by hardware. For example, the determining module may be an independent processing element; or may be integrated in a chip of the apparatuses. Alternatively, the determining module may be stored in a memory of the apparatuses in a form of program code, and invoked and executed by a processing element of the apparatuses. The apparatuses may be configured to perform the methods provided in the foregoing method embodiments. A specific implementation and a technical effect are similar to those of the method embodiments. Details are not described herein again.

For example, the modules may be configured as one or more integrated circuits for implementing the foregoing methods, for example, one or more application-specific integrated circuits (ASIC), one or more microprocessors (DSP), or one or more field programmable gate arrays (FPGA). For another example, when one of the modules is implemented by a processing element by invoking program code, the processing element may be a general-purpose processor, such as a central processing unit (CPU), or another processor that can invoke program code. For another example, the modules may be integrated, and implemented in a form of a system-on-a-chip (SOC). Implementations of other modules are similar. In addition, some or all of the modules may be integrated, or may be independently implemented. The processing element herein may be an integrated circuit with a signal processing capability. In an implementation process, steps in the foregoing methods or the foregoing modules may be implemented by using a hardware integrated logic circuit in the processing element, or by using instructions in a form of software.

For example, the modules may be configured as one or more integrated circuits for implementing the foregoing methods, for example, one or more application-specific integrated circuits (ASIC), one or more microprocessors (DSP), or one or more field programmable gate arrays (FPGA). For another example, when one of the modules is implemented by a processing element by invoking program code, the processing element may be a general-purpose processor, such as a central processing unit (CPU), or another processor that can invoke program code. For another example, the modules may be integrated, and implemented in a form of a system-on-a-chip (SOC).

Figure 22:
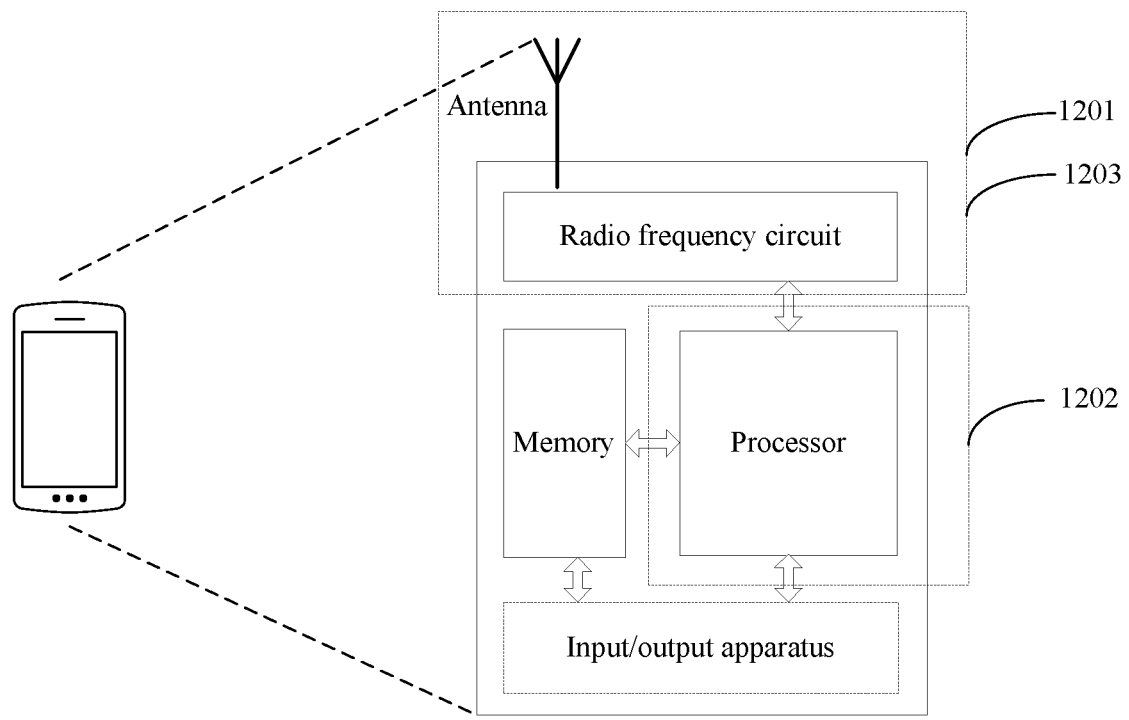
FIG. 22 is a simplified schematic structural diagram of a terminal device.

FIG. 22 is a simplified schematic structural diagram of a terminal device. For ease of understanding and graphic illustration, in FIG. 22, an example in which the terminal device is a mobile phone is used.

As shown in FIG. 22, the terminal device includes a processor, a memory, a radio frequency circuit, an antenna, and an input/output apparatus. The processor is mainly configured to process a communication protocol and communication data, control the terminal device, execute a software program, process data of the software program, and the like. The memory is mainly configured to store the software program and data. The radio frequency circuit is mainly configured to perform conversion between a baseband signal and a radio frequency signal, and process a radio frequency signal. The antenna is mainly configured to send or receive a radio frequency signal in a form of an electromagnetic wave. The input/output apparatus, such as a touchscreen, a display screen, or a keyboard, is mainly configured to receive data entered by a user, and output data to the user. It should be noted that some types of terminal devices may not have an input/output apparatus.

When data needs to be sent, the processor performs baseband processing on the to-be-sent data, and outputs a baseband signal to the radio frequency circuit. The radio frequency circuit performs radio frequency processing on the baseband signal, and sends a radio frequency signal in a form of an electromagnetic wave through the antenna. When data is sent to the terminal device, the radio frequency circuit receives a radio frequency signal through the antenna, converts the radio frequency signal into a baseband signal, and outputs the baseband signal to the processor. The processor converts the baseband signal into data and processes the data. For ease of description, FIG. 22 shows only one memory and one processor. In an actual terminal device product, there may be one or more processors and one or more memories. The memory may also be referred to as a storage medium, a storage device, or the like. The memory may be disposed independently from the processor, or may be integrated with the processor. This is not limited in this embodiment of this application.

In this embodiment of this application, the antenna and the radio frequency circuit that have a sending/receiving function may be considered as a receiving unit and a sending unit (or may be collectively referred to as a transceiver unit) of the terminal device, and the processor that has a processing function may be considered as a processing unit of the terminal device. As shown in FIG. 22, the terminal device includes a receiving unit 1201, a processing unit 1202, and a sending unit 1203. The receiving unit 1201 may also be referred to as a receiver, a receiver circuit, or the like. The sending unit 1203 may also be referred to as a transmitter, a transmitter circuit, or the like. The processing unit may also be referred to as a processor, a processing board, a processing module, a processing apparatus, or the like.

For example, in an embodiment, the sending unit 1203 is configured to perform step S203 in the embodiment shown in FIG. 2.

Figure 23:
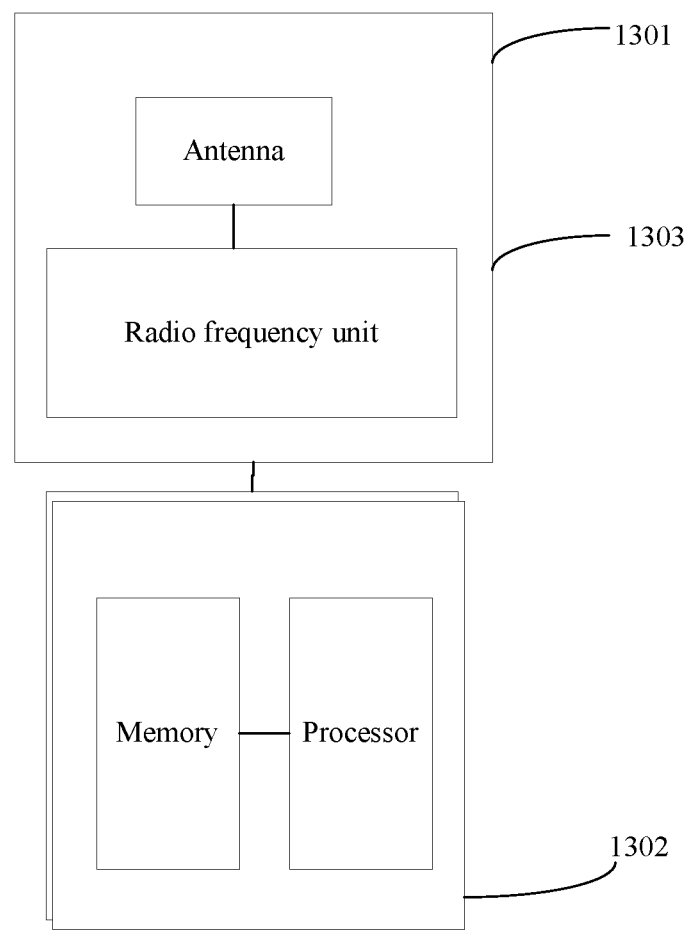
FIG. 23 is a simplified schematic structural diagram of a network device.

FIG. 23 is a simplified schematic structural diagram of a network device. The network device includes a radio frequency signal sending/receiving and conversion part and a part 1302. The radio frequency signal sending/receiving and conversion part further includes a receiving unit part 1301 and a sending unit part 1303 (which may also be collectively referred to as a transceiver unit). The radio frequency signal sending/receiving and conversion part is mainly configured to send/receive a radio frequency signal and perform conversion between a radio frequency signal and a baseband signal. The part 1302 is mainly configured to perform baseband processing, control the network device, and the like. The receiving unit 1301 may also be referred to as a receiver, a receiver circuit, or the like. The sending unit 1303 may also be referred to as a transmitter, a transmitter circuit, or the like. The part 1302 is usually a control center of the network device, may be usually referred to as a processing unit, and is configured to control the network device to perform steps performed by a second communications apparatus in FIG. 5 or FIG. 9. For details, refer to descriptions in the foregoing related part.

The part 1302 may include one or more boards. Each board may include one or more processors and one or more memories. The processor is configured to read and execute a program in the memory, to implement a baseband processing function and control over the network device. If there are a plurality of boards, the boards may be interconnected to improve a processing capability. In an optional implementation, a plurality of boards may share one or more processors, or a plurality of boards may share one or more memories, or a plurality of boards may share one or more processors.

In another optional implementation, with development of a system-on-chip (SoC) technology, all or some of functions of the part 1302 and the part 1301 may be implemented by using the SoC technology, for example, implemented by one base station function chip. The base station function chip is integrated with devices such as a processor, a memory, and an antenna interface. A program of a function related to a base station is stored in the memory, and the processor executes the program to implement the function related to the base station. Optionally, the base station function chip can also read from an external memory of the chip, to implement a function related to the base station.

Optionally, when the random access methods in the foregoing embodiments are fully or partially implemented by software, the terminal or the network device may alternatively include only a processor. A memory configured to store a program is located outside the apparatus. The processor is connected to the memory by using a circuit or an electrical wire, to read and execute the program stored in the memory.

The processor may be a central processing unit (CPU), a network processor (NP), or a combination of a CPU and an NP.

The processor may further include a hardware chip. The hardware chip may be an application-specific integrated circuit (ASIC), a programmable logic device (PLD), or a combination thereof. The PLD may be a complex programmable logic device (CPLD), a field programmable gate array (FPGA), a generic array logic (GAL), or any combination thereof.

The memory may include a volatile memory, such as a random access memory (RAM); or the memory may include a non-volatile memory, such as a flash memory, a hard disk drive (HDD), or a solid-state drive (SSD); or the memory may include a combination of the foregoing types of memories.

An embodiment of this application further provides a computer storage medium. The computer storage medium stores a computer program. The computer program is used to perform the random access methods provided in the foregoing embodiments.

An embodiment of this application further provides a computer program product including an instruction. When the computer program product runs on a computer, the computer is enabled to perform the random access methods provided in the foregoing embodiments.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

What is claimed is:

1. A random access method, comprising:
   receiving, by a terminal, information about random access resources from a network device;
   determining, by the terminal, that a random access resource on a symbol basis is available in a slot based on the information about random access resources and a time resource for receiving a synchronization signal block,
   wherein the available random access resource does not precede the time resource for receiving the synchronization signal block in the slot; and
   sending, by the terminal, a random access preamble to the network device based on the available random access resource.

2. The random access method according to claim 1, wherein the available random access resource is separated with the time resource for receiving a synchronization signal block in the slot.

3. The random access method according to claim 1, further comprising:
   when a symbol for the random access resource overlaps with a symbol of the time resource for receiving a synchronization signal block in the slot,
   determining the symbol for the random access resource that overlaps with the symbol of the time resource for receiving the synchronization signal block in the slot is unavailable for random access.

4. The random access method according to claim 1, further comprising:
   when a symbol of a random access resource overlaps with a symbol of the time resource for receiving a synchronization signal block in the slot,
   sending the random access preamble without using the overlapping symbols in the slot and any symbol that precedes the overlapping symbols in the slot.

5. The random access method according to claim 1, further comprising:
   determining that a symbol of the random access resource overlaps with a symbol of the time resource for receiving a semi-persistent scheduling signal,
   not using the overlapping symbols for receiving the semi-persistent scheduling signal.

6. The random access method according to claim 1, further comprising:
   determining that a symbol for random access resource overlaps with a symbol for receiving a semi-persistent scheduling signal in a slot;
   not using the slot for receiving the semi-persistent scheduling signal.

7. The random access method according to claim 1, further comprising:
   determining the time resource for receiving the synchronization signal block based on one or more of the following:
   a slot occupied by the synchronization signal block, an orthogonal frequency division multiplexing (OFDM) symbol occupied by the synchronization signal block, or a guard period.

8. The random access method according to claim 1, further comprising:
   receiving information about random access resources from a network device comprises random access configuration index and the random access preamble subcarrier spacing;
   determining the available random access resource based on the random access configuration index and the random access preamble subcarrier spacing.

9. An apparatus, comprising:
   one or more memories configured to store instructions; and one or more processors coupled to the one or more memories and configured to execute the instructions, cause the apparatus to:

receive information about random access resources from a network device;

determine that a random access resource on a symbol basis is available in a slot based on the information about random access resources and a time resource for receiving a synchronization signal block, wherein the available random access resource does not precede the time resource for receiving the synchronization signal block in the slot; and send a random access preamble to the network device based on the available random access resource.

10. The apparatus according to claim 9, wherein the available random access resource is separated with the symbol for receiving the synchronization signal block in the slot.

11. The apparatus according to claim 9, the one or more processors are further configured to execute the program instructions, cause the apparatus to:

when a symbol for the random access resource overlaps with a symbol of a time resource for receiving a synchronization signal block in the slot, determine the symbol for the random access resource that overlaps with the symbol of the time resource for receiving the synchronization signal block in the slot is unavailable for random access.

12. The apparatus according to claim 9, the one or more processors are further configured to execute the program instructions, cause the apparatus to:

when a symbol of a random access resource that overlaps with a symbol of the time resource for receiving a synchronization signal block in the slot, send the random access preamble without using the overlapping symbols in the slot and any symbol that precedes the overlapping symbols in the slot.

13. The apparatus according to claim 9, the one or more processors are further configured to execute the program instructions, cause the apparatus to:

determine that a symbol of the random access resource that overlaps with a symbol of the time resource for receiving a semi-persistent scheduling signal, not using the overlapping symbols for receiving the semi-persistent scheduling signal.

14. The apparatus according to claim 9, the one or more processors are further configured to execute the program instructions, cause the apparatus to:

determine whether there is a symbol for random access resource that overlaps with a symbol for receiving the semi-persistent scheduling signal in a slot;

not use the slot for receiving the semi-persistent scheduling signal in which the overlapping symbols are located.

15. The apparatus according to claim 9, the one or more processors are further configured to execute the program instructions, cause the apparatus to:

determine the time resource for receiving the synchronization signal block based on one or more of the following: a slot for the synchronization signal block, an orthogonal frequency division multiplexing (OFDM) symbol for the synchronization signal block, or a guard period.

16. The apparatus according to claim 9, the one or more processors are further configured to execute the program instructions, cause the apparatus to:

receive information about random access resources from a network device comprises random access configuration index and the random access preamble subcarrier spacing;

determine the available random access resource based on the random access configuration index and the random access preamble subcarrier spacing.

* * * * *